United States Patent
Kommula et al.

(10) Patent No.: US 11,178,016 B2
(45) Date of Patent: Nov. 16, 2021

(54) PERFORMING SLICE BASED OPERATIONS IN A DATA PLANE CIRCUIT

(71) Applicant: VMware, Inc., Palo Alto, CA (US)

(72) Inventors: Raja Kommula, Cupertino, CA (US);
Constantine Polychronopoulos, Saratoga, CA (US); Thayumanavan Sridhar, Palo Alto, CA (US);
Marc-Andre Bordeleau, Shawinigan (CA); Edward Choh, Richmond (CA);
Ojas Gupta, Mountain View, CA (US);
Robert Kidd, Champaign, IL (US);
Georgios Oikonomou, Patras (GR);
Jeremy Tidemann, Urbana, IL (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/568,322

(22) Filed: Sep. 12, 2019

(65) Prior Publication Data
US 2021/0064407 A1 Mar. 4, 2021

Related U.S. Application Data

(60) Provisional application No. 62/891,425, filed on Aug. 26, 2019.

(51) Int. Cl.
*G06F 15/173* (2006.01)
*H04L 12/24* (2006.01)
(Continued)

(52) U.S. Cl.
CPC .......... *H04L 41/12* (2013.01); *G06F 9/45541* (2013.01); *G06F 9/45558* (2013.01);
(Continued)

(58) Field of Classification Search
CPC .......... G06F 9/45558; G06F 2009/4557; G06F 2009/45595; G06F 9/546; G06F 9/45541;
(Continued)

(56) References Cited

U.S. PATENT DOCUMENTS 6,504,818 B1  1/2003  Levine
9,124,538 B2  9/2015  Koponen et al.
(Continued)

FOREIGN PATENT DOCUMENTS

WO   2019129374 A1   7/2019
WO   2019229492 A1   12/2019
(Continued)

OTHER PUBLICATIONS

Non-Published Commonly Owned International Patent Application PCT/US2020/16833, filed Feb. 5, 2020, 95 pages, VMware, Inc.
(Continued)

*Primary Examiner* — Anh Nguyen
(74) *Attorney, Agent, or Firm* — Adeli LLP

(57) ABSTRACT

Some embodiments of the invention provide a novel method of performing network slice-based operations on a data message at a hardware forwarding element (HFE) in a network. For a received data message flow, the method has the HFE identify a network slice associated with the received data message flow. This network slice in some embodiments is associated with a set of operations to be performed on the data message by several network elements, including one or more machines executing on one or more computers in the network. Once the network slice is identified, the method has the HFE process the data message flow based on a rule that applies to data messages associated with the identified slice.

19 Claims, 20 Drawing Sheets

(51) Int. Cl.
  *G06F 9/455* (2018.01)
  *H04L 12/721* (2013.01)
  *H04L 12/861* (2013.01)
  *G06F 9/54* (2006.01)

(52) U.S. Cl.
  CPC ............ *G06F 9/546* (2013.01); *H04L 41/082* (2013.01); *H04L 41/0893* (2013.01); *H04L 41/0896* (2013.01); *H04L 45/38* (2013.01); *H04L 49/9068* (2013.01); *G06F 2009/4557* (2013.01); *G06F 2009/45595* (2013.01)

(58) Field of Classification Search
  CPC ... H04L 41/082; H04L 41/12; H04L 41/0893; H04L 41/0896; H04L 45/38; H04L 49/9068; H04L 47/828; H04L 47/787; H04L 45/64
  See application file for complete search history.

(56) References Cited

U.S. PATENT DOCUMENTS

| | | |
|---|---|---|
| 10,111,163 B2 | 10/2018 | Vrzic et al. |
| 10,461,421 B1 | 10/2019 | Tran et al. |
| 10,555,134 B2 | 2/2020 | Shaw et al. |
| 10,609,530 B1 | 3/2020 | Patil et al. |
| 10,708,143 B2 | 7/2020 | Zhang et al. |
| 10,708,189 B1 | 7/2020 | Agrawal et al. |
| 10,735,331 B1 | 8/2020 | Li et al. |
| 10,834,669 B2 | 11/2020 | Bordeleau et al. |
| 10,939,369 B2 | 3/2021 | Bordeleau et al. |
| 11,012,288 B2 | 5/2021 | Kommula et al. |
| 2003/0026205 A1 | 2/2003 | Mullendore et al. |
| 2006/0146712 A1* | 7/2006 | Conner .................. H04L 45/123 370/235 |
| 2013/0125230 A1 | 5/2013 | Koponen et al. |
| 2015/0074264 A1 | 3/2015 | Izhak-Ratzin et al. |
| 2015/0381493 A1 | 12/2015 | Bansal et al. |
| 2016/0335107 A1* | 11/2016 | Behera .................. H04L 69/329 |
| 2016/0344565 A1 | 11/2016 | Batz et al. |
| 2016/0353465 A1 | 12/2016 | Vrzic et al. |
| 2016/0360408 A1 | 12/2016 | Senarath et al. |
| 2017/0054595 A1 | 2/2017 | Zhang et al. |
| 2017/0085628 A1 | 3/2017 | Mahindra et al. |
| 2017/0142591 A1 | 5/2017 | Vrzic |
| 2017/0250906 A1 | 8/2017 | MeLampy et al. |
| 2017/0264483 A1 | 9/2017 | Lambeth et al. |
| 2017/0289791 A1 | 10/2017 | Yoo et al. |
| 2017/0332212 A1 | 11/2017 | Gage |
| 2017/0332421 A1 | 11/2017 | Sternberg et al. |
| 2018/0183866 A1 | 6/2018 | Gunda et al. |
| 2018/0219762 A1 | 8/2018 | Wang et al. |
| 2018/0220276 A1 | 8/2018 | Senarath et al. |
| 2018/0220277 A1 | 8/2018 | Senarath et al. |
| 2018/0248770 A1 | 8/2018 | Regmi et al. |
| 2018/0270713 A1 | 9/2018 | Park et al. |
| 2018/0270743 A1 | 9/2018 | Callard et al. |
| 2018/0295036 A1 | 10/2018 | Krishnamurthy et al. |
| 2018/0332441 A1* | 11/2018 | Shaw ..................... H04L 41/12 |
| 2018/0368060 A1 | 12/2018 | Kedalagudde et al. |
| 2019/0053104 A1 | 2/2019 | Qiao et al. |
| 2019/0075082 A1 | 3/2019 | Adam et al. |
| 2019/0104458 A1 | 4/2019 | Svennebring et al. |
| 2019/0123963 A1 | 4/2019 | Tang et al. |
| 2019/0124704 A1* | 4/2019 | Sun ....................... H04W 76/11 |
| 2019/0150080 A1 | 5/2019 | Davies et al. |
| 2019/0158364 A1 | 5/2019 | Zhang et al. |
| 2019/0159117 A1 | 5/2019 | Kuge et al. |
| 2019/0174573 A1 | 6/2019 | Velev et al. |
| 2019/0187999 A1 | 6/2019 | Lu et al. |
| 2019/0191309 A1 | 6/2019 | Kweon et al. |
| 2019/0200286 A1 | 6/2019 | Usui et al. |
| 2019/0268973 A1 | 8/2019 | Bull et al. |
| 2019/0287146 A1 | 9/2019 | Maitland et al. |
| 2019/0289470 A1 | 9/2019 | Vaidya et al. |
| 2019/0320494 A1 | 10/2019 | Jayawardene et al. |
| 2019/0373520 A1* | 12/2019 | Sillanpaa .............. H04W 36/14 |
| 2020/0007445 A1 | 1/2020 | Anwer et al. |
| 2020/0053531 A1 | 2/2020 | Myhre et al. |
| 2020/0067831 A1 | 2/2020 | Spraggins et al. |
| 2020/0077327 A1 | 3/2020 | Duan et al. |
| 2020/0120721 A1 | 4/2020 | Lau et al. |
| 2020/0137621 A1* | 4/2020 | Yang .................... H04W 76/27 |
| 2020/0213360 A1 | 7/2020 | Ojha et al. |
| 2020/0235990 A1 | 7/2020 | Janakiraman et al. |
| 2020/0273314 A1 | 8/2020 | Bordeleau et al. |
| 2020/0275281 A1 | 8/2020 | Bordeleau et al. |
| 2020/0275357 A1 | 8/2020 | Bordeleau et al. |
| 2020/0275358 A1 | 8/2020 | Bordeleau et al. |
| 2020/0275359 A1 | 8/2020 | Bordeleau et al. |
| 2020/0275360 A1 | 8/2020 | Bordeleau et al. |
| 2020/0314029 A1 | 10/2020 | Gopinath et al. |
| 2021/0064451 A1 | 3/2021 | Kommula et al. |
| 2021/0067416 A1 | 3/2021 | Kommula et al. |
| 2021/0067439 A1 | 3/2021 | Kommula et al. |

FOREIGN PATENT DOCUMENTS

| | | |
|---|---|---|
| WO | 2020171957 A1 | 8/2020 |
| WO | 2021040935 A1 | 3/2021 |

OTHER PUBLICATIONS

Non-Published Commonly Owned U.S. Appl. No. 16/443,810, filed Jun. 17, 2019, 95 pages, VMware, Inc.
Non-Published Commonly Owned U.S. Appl. No. 16/443,812, filed Jun. 17, 2019, 38 pages, VMware, Inc.
Non-Published Commonly Owned U.S. Appl. No. 16/443,813, filed Jun. 17, 2019, 49 pages, VMware, Inc.
Non-Published Commonly Owned U.S. Appl. No. 16/443,815, filed Jun. 17, 2019, 49 pages, VMware, Inc.
Non-Published Commonly Owned U.S. Appl. No. 16/443,816, filed Jun. 17, 2019, 54 pages, VMware, Inc.
Non-Published Commonly Owned U.S. Appl. No. 16/443,818, filed Jun. 17, 2019, 64 pages, VMware, Inc.
Non-Published Commonly Owned Related U.S. Appl. No. 16/568,325 with similar specification, filed Sep. 12, 2019, 55 pages, VMware, Inc.
Non-Published Commonly Owned Related U.S. Appl. No. 16/568,330 with similar specification, filed Sep. 12, 2019, 55 pages, VMware, Inc.
Non-Published Commonly Owned Related U.S. Appl. No. 16/568,332 with similar specification, filed Sep. 12, 2019, 55 pages, VMware, Inc.
Non-Published Commonly Owned International Patent Application PCT/US2020/043648, filed Jul. 26, 2020, 55 pages, VMware, Inc.
Blenk, Andreas, et al., "Survey on Network Virtualization Hypervisors for Software Defined Networking", IEEE Communications Surveys & Tutorials, Jan. 27, 2016, 32 pages, vol. 18, No. 1, IEEE.
PCT International Search Report and Written Opinion of commonly owned International Patent Application PCT/US2020/043648, dated Nov. 13, 2020, 20 pages, International Searching Authority (EPO).

* cited by examiner

PERFORMING SLICE BASED OPERATIONS IN A DATA PLANE CIRCUIT

In recent years, there has been a proliferation of Software-Defined Datacenters (SDDC), and software tools for defining and controlling computer and network services in the SDDCs. Some of these tools define logical network resources (e.g., logical switches, logical routers, logical middlebox elements) that span multiple physical constructs (e.g., multiple host computers, etc.). However, many of these tools often ignore a large part of SDDCs, which are the underlay network elements of these datacenters. Examples of these network elements include hardware switches (e.g., top-of-rack switches, spine switches, etc.), hardware routers, hardware middlebox appliances, etc.

BRIEF SUMMARY

Some embodiments of the invention provide a novel method of performing network slice-based operations on a data message at a hardware forwarding element (HFE) in a network. For a received data message flow, the method has the HFE identify a network slice associated with the received data message flow. This network slice in some embodiments is associated with a set of operations to be performed on the data message by several network elements, including one or more machines executing on one or more computers in the network. The network in some embodiments is a telecommunication network, and the operations are part of a chain of service operations that the network performs on data messages from its devices (e.g., the mobile devices in the network). Once the network slice is identified, the method has the HFE process the data message flow based on a rule that applies to data messages associated with the identified slice.

In some embodiments, the HFE includes a data plane (DP) circuit (e.g., an application specific integrated circuit, ASIC) that receives data messages and forwards the data messages in the network. In some of these embodiments, the DP circuit identifies the flow's network slice by identifying a slice identifier associated with the network slice. The DP circuit in these embodiments then processes the data message flow by (1) using the slice identifier to identify a rule stored in the DP circuit, and (2) performing an operation on the data message that is associated with the identified rule. The HFE in some embodiments also includes a control plane circuit (e.g., a microprocessor and associated program) for providing configuration data that configures the DP circuit with rules for processing data messages.

In some embodiments, the DP circuit identifies the rule associated with the received data message flow by matching the slice identifier that it identifies for the data message flow with a slice identifier that is part of a rule identifier of the rule. The identified rule in some embodiments is a forwarding rule that specifies a forwarding operation to forward the data message flow to a particular port of the HFE. In some embodiments, the slice-based forwarding rules are next-hop forwarding rules that specify next hops of different paths to the same destinations in the network. In other embodiments, the slice-based forwarding rules are next-hop forwarding rules that specify different next hops of different paths to different destinations in the network. For instance, in some embodiments, the different slice-based forwarding rules select different ports connected to different datacenters for processing the data message flows that are associated with the different slice identifiers. In some embodiments, the slice-based forwarding rules can specify logical forwarding operations of logical forwarding elements that are defined to span multiple physical forwarding elements.

The identified rule in some embodiments is a middlebox service rule that is associated with a middlebox service operation to perform on the data message flow. For instance, in some embodiments, the identified rule is a firewall rule that determines whether to drop or allow the data messages of the flow based on the flow's associated slice identifier. In other embodiments, the identified rule is a load balancing rule that specifies a load balancing operation to perform on the data message flow based on its associated slice identifier. This load balancing operation in some embodiments distributes the data message load among several different destinations or different paths in the network based on the slice identifiers associated with these data message flows.

As mentioned above, some embodiments specify for a network slice a set of operations to perform on the data message flows that are associated with the network slice. These operations in some embodiments include several operations performed by several devices in the network. In some embodiments, these devices include machines executing on host computers to perform at least one or more of the operations associated with the network slice. These machines in some embodiments include virtual machines (VMs) and/or containers. Also, in some embodiments, the operations that these machines perform are virtual network functions (VNFs) implemented by a telecommunication network. These VNFs are part of service chains performed by the telecommunication network's infrastructure on the data message flows passing through the network. In some embodiments, different network slices correspond to different types of traffic passing through the telecommunication network.

The HFE uses different techniques in different embodiments to identify a network slice for a received data message flow. In some embodiments, the HFE forwards the data messages of the flow to an external device separate from the HFE. This external device analyzes the data messages that it receives, identifies the associated slice identifier for the flow, and configures the HFE (e.g., the HFE DP circuit through an API (application programming interface) call to the HFE's CP circuit) with a match record to use to match subsequent data messages of the flow with the flow's slice ID. This external device in some embodiments forwards the data messages that it receives to their next-hop destinations, before the HFE has been configured with the match record. The external device in some embodiments is a standalone appliance, while in other embodiments is a host computer on which a machine executes to analyze data messages received from the HFE in order to ascertain their associated slice identifiers.

In other embodiments, the HFE's DP circuit forwards the received data message flow to the HFE's CP circuit, which then identifies the slice identifier for the received data message and provides this slice identifier back to the DP circuit along with the data message for processing. In some embodiments, the CP circuit provides the slice identifier as part of a configuration data that configures the HFE (e.g., the HFE DP circuit through its CP circuit) with a match record to use to match subsequent data messages of the flow with the flow's slice ID.

In some embodiments, the CP circuit executes a resource sharing program and a machine that executes on top of this program identifies the slice identifier for the received data message. In some embodiments, the program is a virtualization program (e.g., a hypervisor) or a Linux operating system, and the machine is a virtual machine or container.

The CP circuit's resource sharing program in some embodiments is a hypervisor that includes a context engine that associates data message attributes with slice identifiers. This context engine uses a set of attributes of the received data message flow to identify the slice identifier for the received flow.

In some embodiments, the context engine executing on the CP circuit receives records matching data message attributes with slice identifiers from context engines of hypervisors executing on host computers. In other embodiments, the CP circuit's context engine receives records matching data message attributes with slice identifiers from a set of one or more servers acting as a set of network managers or controllers. In still other embodiments, the context engine receives a record associating a data message flow's attribute set (e.g., its five or seven tuple identifier) with a slice identifier from a virtual machine (VM) executing on top of the hypervisor.

In some embodiments, the hypervisor that executes on the HFE's CP circuit is the same or similar to the hypervisors executing on the host computers in the network. These similar or identical hypervisors provide a common platform through which the managers and/or controllers in the network can manage both the HFE, the host computers, and the software forwarding elements executing on the host computers. Specifically, in these embodiments, the managers and/or controllers manage and/or control the HFE's CP circuit like they manage and/or controller the host computers and the software forwarding elements executing on these host computers. In some embodiments, the hypervisor executing on the HFE's CP circuit uses the same NIC (network interface controller) data model abstraction for the HFE's data plane circuit as the host computer hypervisors. For the hypervisor executing on the HFE's CP circuit, these embodiments use a translator plugin to convert the hypervisor communication with the data plane circuit from a NIC data model format to a DP circuit model format.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
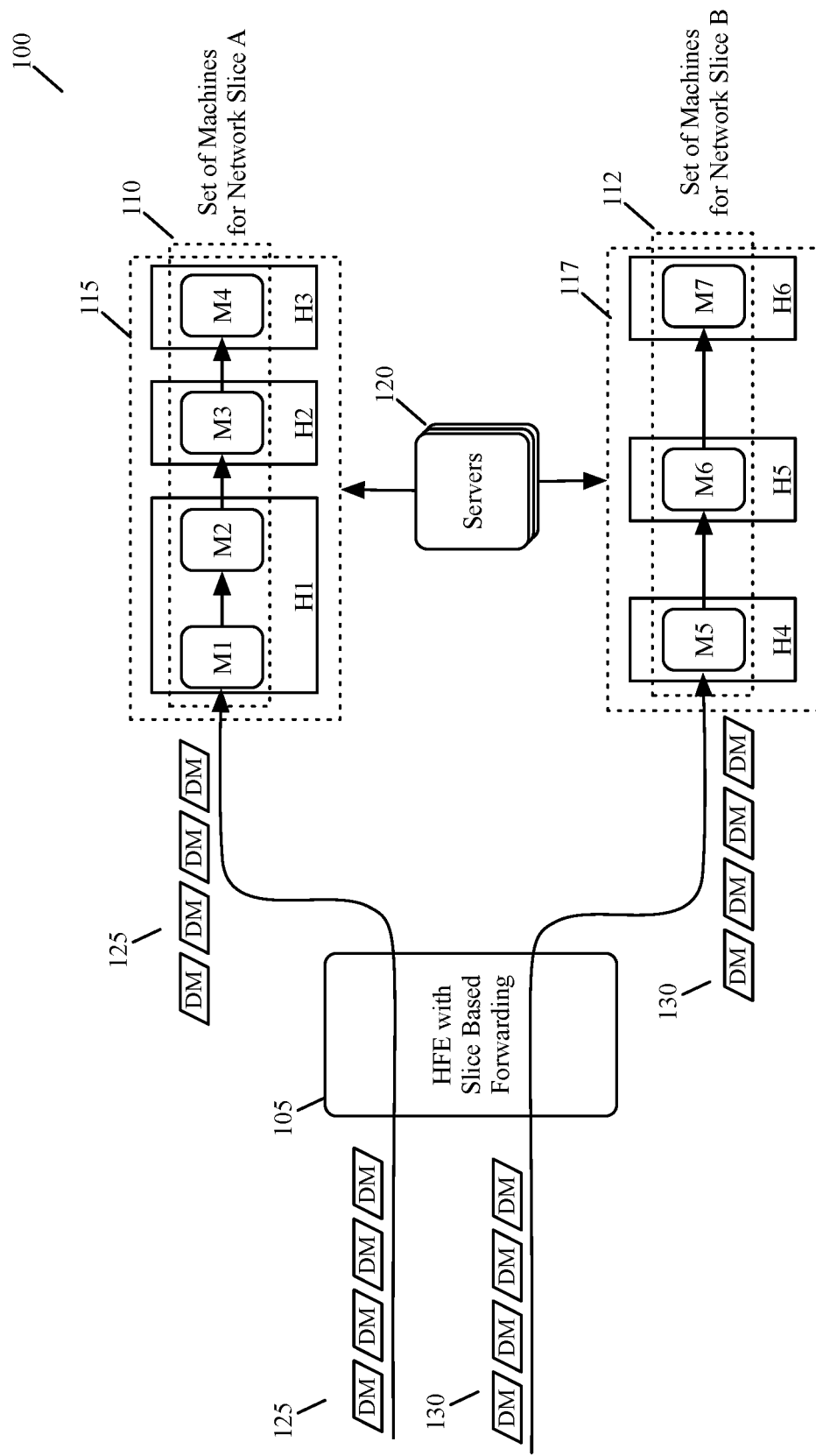
FIG. 1 illustrates an example of a software defined datacenter (SDDC) that includes several network elements that perform different chains of operations on different data message flows that are associated with different slice identifiers corresponding to different network slices.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel method of performing network slice-based operations on a data message flow at a hardware forwarding element (HFE) in a network. For a data message flow received by the HFE, the method has the HFE (1) identify a network slice associated with the received data message flow, and then (2) based on the identified network slice, perform an operation on the received data message flow.

In some embodiments, the identified network slice is associated with a set of operations that need to be performed on the received data message flow by a set of network elements. In some embodiments, a network slice refers to the set of operations to perform on data messages associated with the network slice, while in other embodiments, the network slice refers to the network elements that are to perform the set of operation on the data messages associated with the network slice. In addition to the HFE, the set of network elements typically include other elements that perform one or more operations on the data message based on the data message flow's association with the network slice. The set of network elements includes in some embodiments one or more machines executing on one or more computers in the network.

The HFE in some embodiments identifies the network slice associated with the received data message flow by identifying a slice identifier that is associated with the received data message flow. As further described below, the HFE identifies the slice identifier (ID) of the received data message flow differently in different embodiments, e.g., by using programs that the HFE executes or by using other devices and/or programs.

After obtaining the slice ID for the received data message, the HFE in some embodiments processes the data message flow by (1) using the slice identifier to identify one of its rules, and (2) performing an operation on the data message flow that is associated with the identified rule. The HFE in some embodiments stores several rules that have slice IDs as part of their rule identifiers. In these embodiments, the HFE matches a data message of the flow to a rule by matching the message's associated slice identifier with the slice identifier in the identifier of the rule.

In some embodiments, one or more service chains can be defined for each network slice, with each service chain specifying one or more ordered sequence of operations (e.g., compute operations, forwarding operations, and/or service operations, etc.) to perform on the data message flows associated with the chain's network slice. In some embodiments, a network slice is a grouping of resources (e.g., compute resources, forwarding resources, service resources, etc.) in a network (e.g., a network of one or more datacenters). Some embodiments allow a group of one or more data message flows to be associated with a network slice, in order to have the data message flows processed by the group of resources of the network slice.

For instance, in some embodiments, the network is a telecommunication network (e.g., a 5G telecommunication network) for which multiple network slices can be defined. Examples of such slices for a 5G telecommunication network include a mobile broadband slice for processing broadband data, an IoT (Internet of Things) slice for processing IoT data, a telemetry slice for processing telemetry data, a VOIP (voice over IP) slice for voice over IP data, a video conferencing slice for processing video conferencing data, a device navigation slice for processing navigation data, etc.

In this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

FIG. 1 illustrates an example of a software-defined datacenter (SDDC) 100 that includes several network elements that perform different chains of operations on different data message flows that are associated with different slice identifiers corresponding to different network slices. The network elements in this example include an HFE 105 and two sets of machines 110 and 112 executing on two sets of host computers 115 and 117. The SDDC 100 in this example also includes a set of one or more servers 120 for managing and controlling the HFE 105 and the host computers 115 and 117.

In this example, the HFE 105 receives two different data message flows 125 and 130 that are associated with two different network slices. The data message flows in this example do not include slice IDs (e.g., in their encapsulation headers) that identify their corresponding network slices. Hence, the HFE 105 identifies a slice ID for each data message flow 125 or 130. Different techniques that the HFE 105 uses in different embodiments to identify the slice identifier for a data message flow will be described below.

After identifying the slice ID for a particular data message flow, the HFE 105 (1) uses the identified slice ID to select a rule for forwarding the data message flow, and (2) forwards the data messages of the flow to a set of machines 110 or 112 based on the selected rule. For instance, in some embodiments, the HFE 105 stores several next-hop forwarding rules. Each of these rules specifies a next hop for a data message of the flow that matches the rule. Each rule also has a rule identifier that includes a slice identifier. In some embodiments, the rule identifier of a forwarding rule can also include other data message attributes (e.g., other header fields).

The HFE 105 matches a data message with a forwarding rule by comparing the identified slice ID for its flow with the rule identifiers of one or more forwarding rules. This comparison in some embodiments also uses one or more header values of the data message's flow (e.g., one or more attributes in the five or seven tuple identifier of the flow). After matching the data message with a forwarding rule, the HFE 105 then uses the next-hop destination specified by the matching forwarding rule to forward the data message to one of the two sets of machines 110 or 112. In this example, data messages that are part of the flow 125 are sent to the machine set 110, while the data messages that are part of the flow 130 are send to the machine set 112.

In the example of FIG. 1, the two sets of machines 110 or 112 perform two different chains of operations associated with two different network slices. As illustrated, in each chain, some machines can run on the same host computer, while other machines run on other host computers. Also, in this example, the different chains have a different number of operations. However, one of ordinary skill will realize that in some embodiments the different alternative chains can have the same number of operations, or even the same operations performed by different set of compute resources (e.g., computers, virtual machines, containers, etc.) and networking resources (e.g., switches, routers, middlebox appliances, etc.)

The machines in some embodiments include virtual machines (VMs) and/or containers. Also, in some embodiments, the operations that the machines perform are virtual network functions (VNFs) implemented by a telecommunication network. The VNFs are part of service chains performed by the telecommunication network's infrastructure on the data messages passing through the network. In some embodiments, the different network slices correspond to different types of traffic passing through the telecommunication network.

The server set 120 deploys and configures each of the sets of machines 110 or 112 to process the data messages for a particular network slice associated with a particular slice ID. For instance, in some embodiments, the set of machines 110 are deployed and configured to process data messages associated with slice ID A, while the set of machines 112 are deployed and configured to process data messages associated with slice ID B.

Also, in some embodiments, one or more machines in the sets 110 and 112 perform their operations by (1) identifying the slice ID associated with a data message flow, and (2) based on the identified slice ID, selecting an operation to perform on the data messages of the flow. However, in other embodiments, the machines 110 and 112 do not select the operations that they perform on the data messages that they process based on the slice IDs of these message flows. Instead, in these embodiments, these machines are just deployed and configured to process data messages associated with certain slice IDs.

The HFE 105 is a top-of-rack (TOR) switch in some embodiments. In other embodiments, it is a gateway, e.g., a gateway at a north-south boundary of a network. In still other embodiments, the HFE 105 is a middlebox appliance. Also, after identifying a slice ID for a data message flow, the HFE 105 in some embodiments encapsulates the data messages of this flow with a header, and inserts the slice ID in the encapsulating header of each data message, so that subsequent network elements can use the slice ID in performing their operations.

Figure 2:
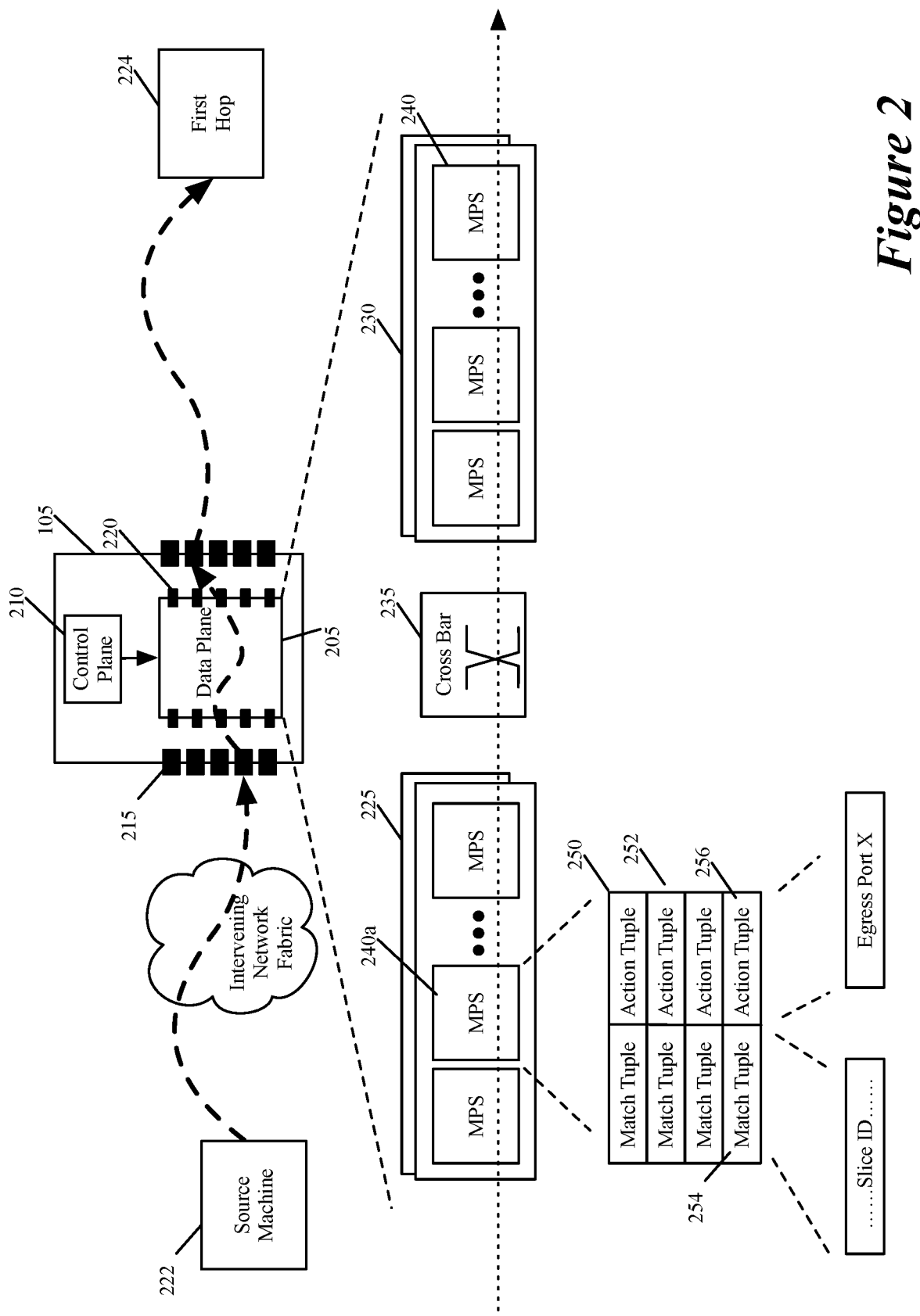
FIG. 2 illustrates an example of a hardware forwarding element (HFE) of some embodiments.

FIG. 2 illustrates an example of the HFE 105 of some embodiments. As shown, the HFE 105 includes a data plane (DP) circuit 205, a control plane (CP) circuit 210, a set of forwarding element (FE) ports 215 and a set of DP ports 220. The HFE 105 can be an edge forwarding element that connects to source and/or destination computers in a network, or a non-edge forwarding element that connects to other forwarding elements in the network. Through wired or wireless connections, the HFE 105 receives data messages to process from its FE ports 215, and transmits processed data messages from its FE port 215. In this example, the HFE 105 is shown as receiving a data message from a source machine 222 and forwarding the data message to a first hop 224 along a first service chain.

The DP circuit 205 processes the data messages that the HFE 105 receives. The DP ports 220 receive data messages from, and transmit data messages to, the FE ports 215. The DP circuit 205 is an application specific integrated circuit (ASIC) with several ingress message-processing pipelines 225, several egress message-processing pipelines 230 and a crossbar switch 235 that connects the ingress pipelines 225 to the egress pipelines 230. Each ingress or egress pipeline includes several message processing stages 240, each of which can perform one or more operations on a data message.

In some embodiments, a message processing stage 240 tries to match a data message's associated attribute set (e.g., header values, slice ID, etc.) with one or more rules that it stores. When it finds a matching rule, the message processing stage 240 performs the operation (i.e., the action) associated with the matching rule. In some embodiments, the CP circuit 210 provides configuration data that configures the DP circuit 205 with rules that the message processing stages 240 use in processing the data messages. The CP circuit 210 in some embodiments includes a memory that stores a control plane program and a processor (e.g., an x86 microprocessor) that executes the control plane program.

To process a data message flow based on its associated network slice, the DP circuit 205 uses one of several techniques described below to first identify the flow's associated slice ID that specifies its network slice. After identifying the slice ID for the flow, the DP circuit 205 in these embodiments processes the data message flow by (1) using the slice identifier to identify a rule stored in the DP circuit 205, and (2) performing an operation on the data messages of the flow that is associated with the identified rule.

As shown in FIG. 2, a message processing stage 240*a* in an ingress pipeline 225 includes a match-action table 250 that stores several records 252, with each record having a match tuple 254 and an action tuple 256. In some embodiments, the records 252 are conceptual records as the match and action tuples are stored in different tables but are associated through an addressing scheme (e.g., an action tuple is stored in its action table at a location that corresponds to a location in a match table at which its corresponding match tuple is stored). A match tuple of each record (also called a rule) specifies a set of data message attributes (e.g., any of the data message seven tuple identifiers, which are source and destination IP, source and destination port, protocol, and source and destination MAC addresses), while the action tuple of the record specifies the action to perform on a data message that matches the record's match tuple.

A message processing stage 240 compares a received data message's set of attributes with a record's match tuple to determine whether the data message matches the record, and if so, it performs the action specified by the record's action tuple. The match tuple of each rule is effectively the rule's identifier as it uniquely identifies the rule. As shown, the match tuples 254 of the records 252 of the match-action table 250 include the slice IDs. In addition, the match tuples of the records 252 can include other attributes of the data message (e.g., any of its five tuple identifiers, which are source and destination IP, source and destination port, and protocol).

To forward a data message flow from the source machine 222 to the first hop along its service chain based on the flow's associated slice ID, the message processing stage 240*a* in some embodiments compares the slice ID associated with a received data message of the flow with one or more match tuples 254 of one or more records 252 in the match-action table 250 to identify a record with a matching slice ID.

Upon finding a matching record, the message processing stage 240*a* in some embodiments retrieves the egress port ID from the action tuple of the matching record. This egress port ID specifies the DP egress port from which the received data message should leave the DP circuit. In this example, the identified DP egress port is associated with the first hop of a service chain for the network slice identified by the slice ID associated with the data message's flow.

The egress port identifier is used subsequently by other message processing stages 240 and/or crossbar switch 235 to direct the data message to the egress pipeline associated with the identified egress port. The egress pipeline then provides this data message to the identified egress port, which, in turn, provides the data message to its associated FE egress port that then forwards the data message to the first hop service node 224.

Figure 3:
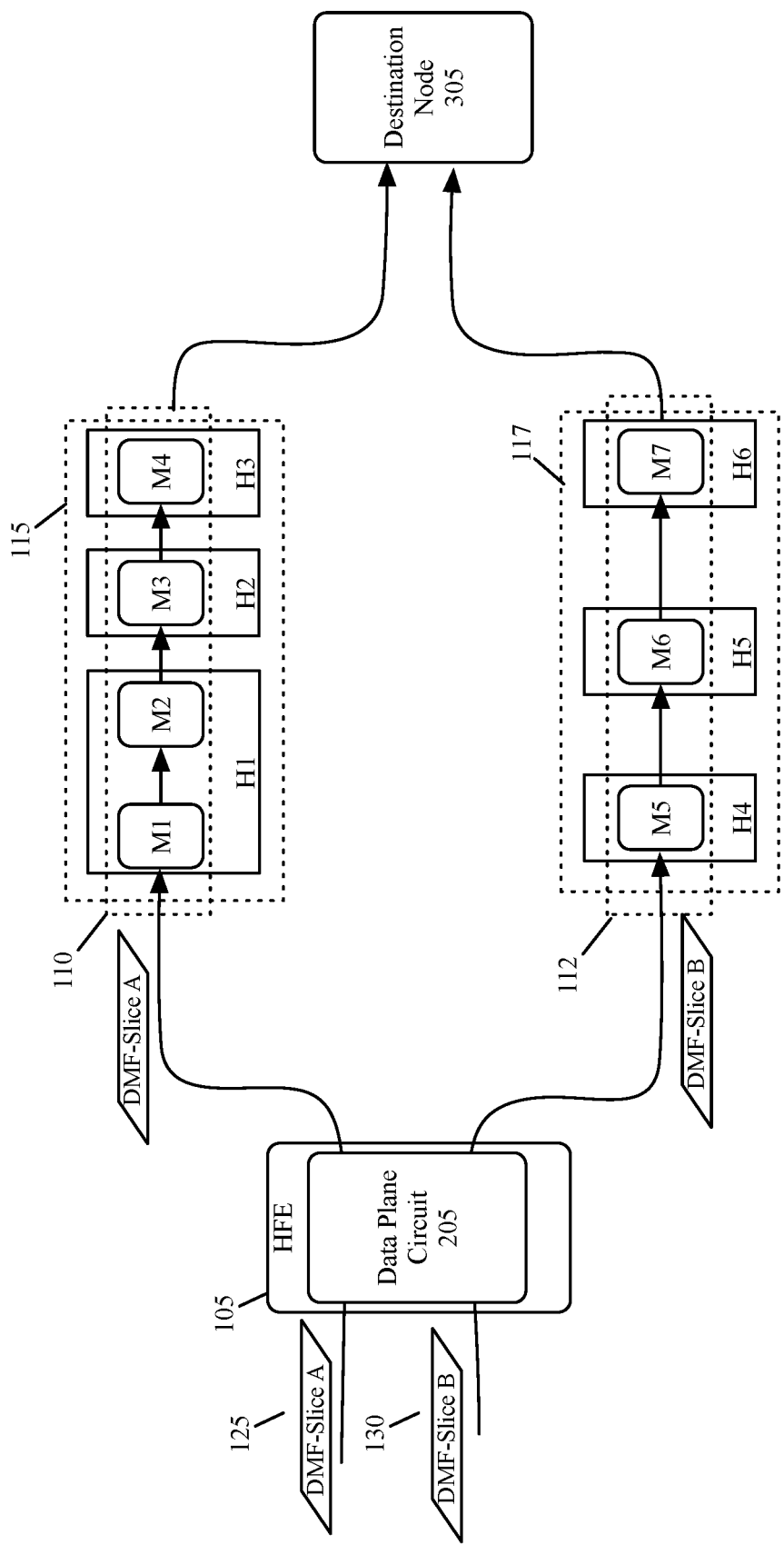
FIG. 3 illustrates an example of a data plane (DP) circuit forwarding data messages along different paths to the same destination based on slice-based rules.

In some embodiments, the slice-based forwarding rules of the DP circuit 205 are next-hop forwarding rules that specify next hops of different paths to the same destinations in the network. FIG. 3 illustrates an example of this. This figure illustrates a DP circuit 205 of the HFE 105 forwarding two different data message flows 125 and 130 associated with two different slice IDs A and B to two different sets of machines 110 and 112 to perform two different sets of operations on their respective data message flows.

After being processed by its respective set of machines 110 or 112, each data message flow 125 or 130 is forwarded by the software forwarding element of the last host computer of the last machine in its set of machines to the same destination node 305. In some embodiments, the destination node 305 is another machine. In other embodiments, the destination node 305 is a middlebox appliance, or a cluster of middlebox appliances (associated with the same virtual network address, such as a same virtual IP address), that performs the same middlebox service operation on both data message flows.

Figure 4:
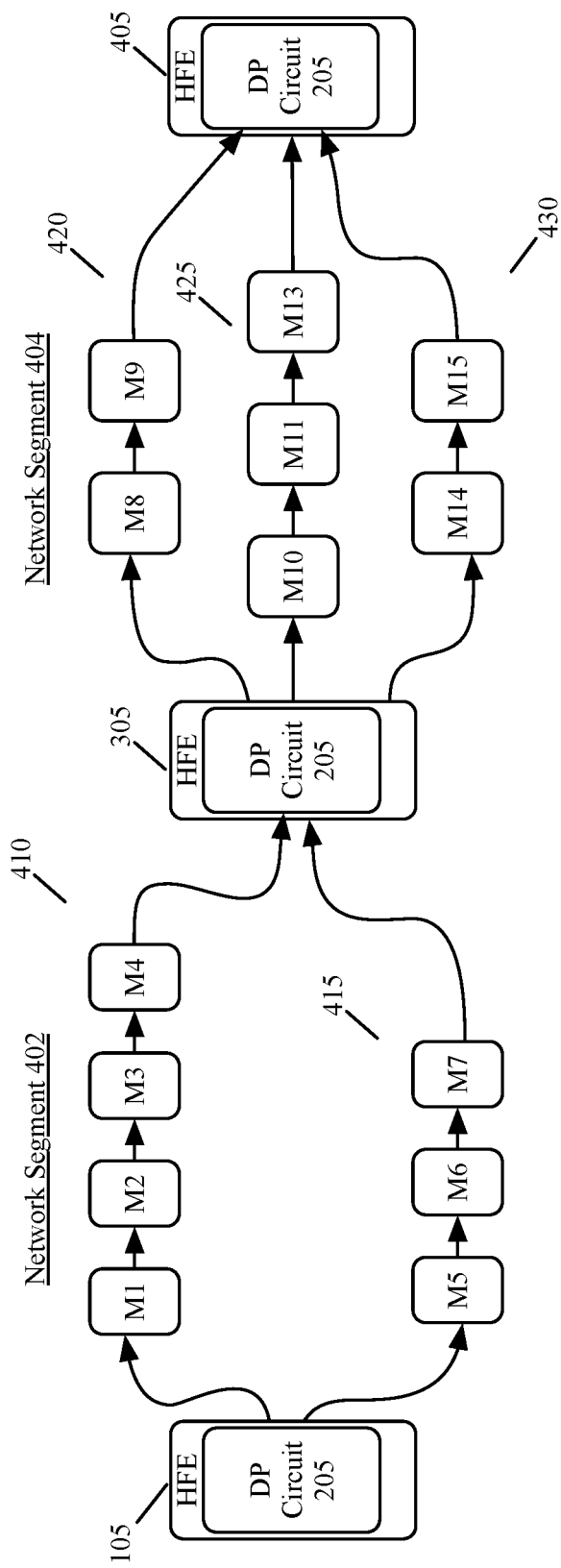
FIG. 4 illustrates two HFEs of some embodiments defining the start of different segments of a datacenter network.

In still other embodiments, this destination node 305 is another hardware forwarding element that is associated with another segment of a datacenter network. In some of these embodiments, the HFEs 105 and 305 define the start of different segments of the datacenter network, as shown in FIG. 4. In this example, three HFEs 105, 305 and 405 define two segments 402 and 404 of the network, with the HFE 105 forwarding the data message flows along two paths 410 and 415 based on the slice IDs associated with these flows, while the HFE 305 forwards the data message flows along three paths 420, 425 and 430 based on the slice IDs.

Figure 5:
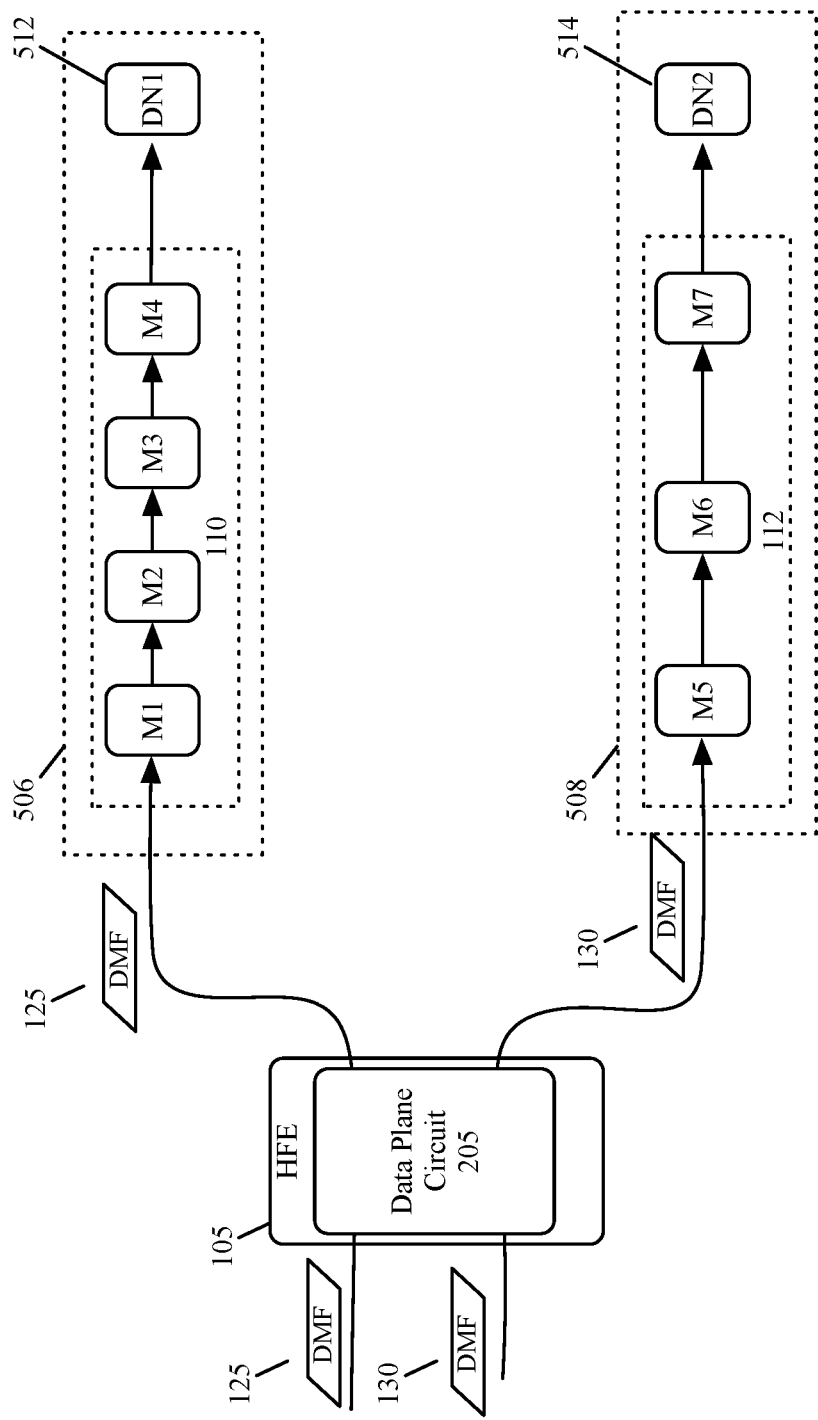
FIG. 5 illustrates an example of a DP circuit forwarding data messages along different paths to the different destinations based on slice-based rules

In some embodiments, the slice-based forwarding rules of the DP circuit 205 are next-hop forwarding rules that specify next hops of different paths to different destinations in the network. FIG. 5 illustrates an example of this. This figure illustrates a DP circuit 205 of the HFE 105 forwarding two different data message flows 125 and 130 associated with two different slice IDs A and B along two different paths 506 and 508 that terminate at two different destination end nodes (e.g., destination compute nodes) 512 and 514 in a datacenter.

Figure 6:
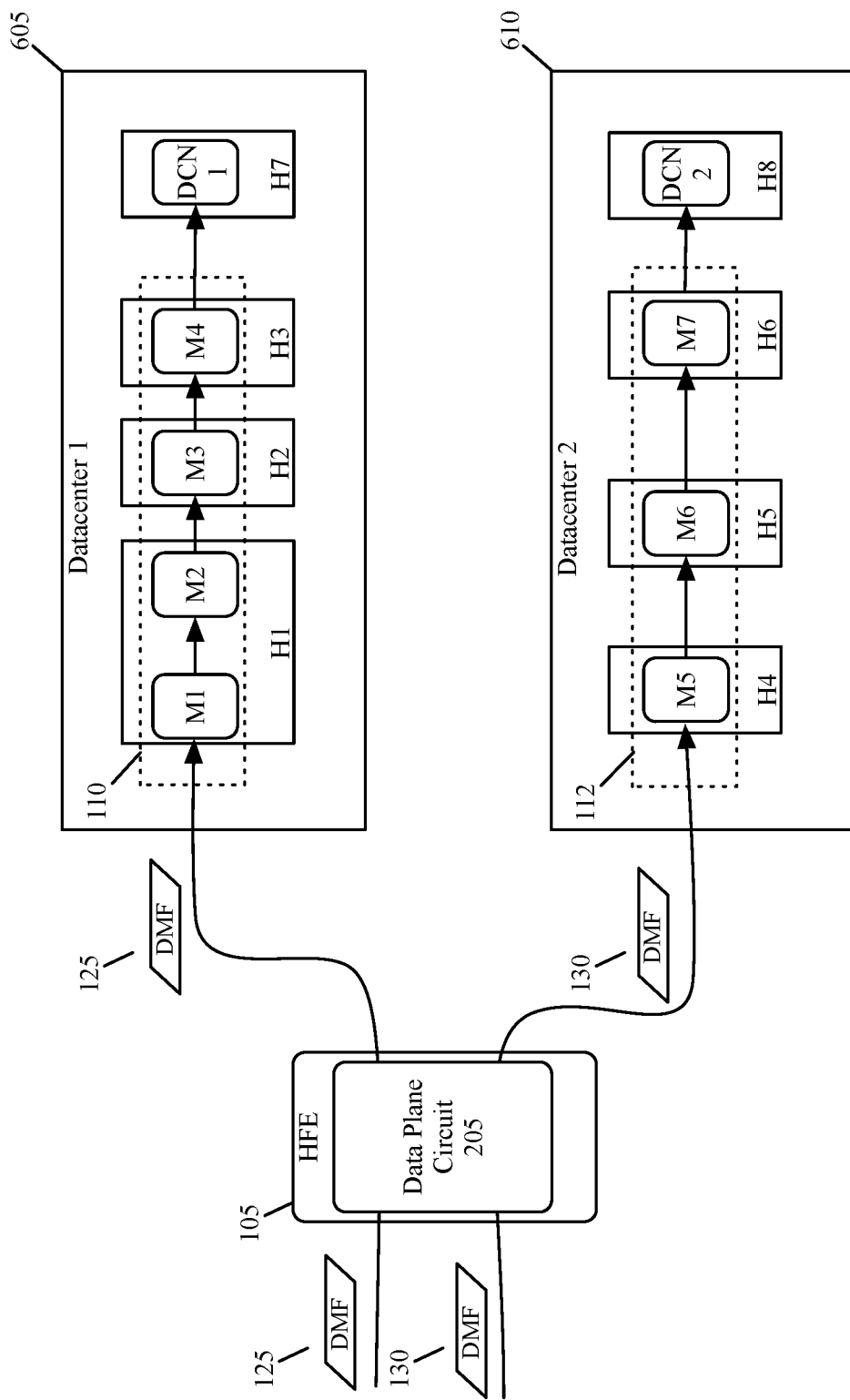
FIG. 6 illustrates an example in which the DP circuit forwards two different data message flows associated with two different slice IDs to two different sets of machines in two different datacenters.

FIG. 6 illustrates an example in which the DP circuit 205 of the HFE 105 forwards two different data message flows 125 and 130 associated with two different slice IDs A and B to two different sets of machines 110 and 112 in two different datacenters 605 and 610. In some embodiments, data message flows for different types of slices are sent to different datacenters for processing. For example, in some embodiments, data message flows for mobile telemetry data (e.g., telemetry slice) are sent to one datacenter, data message flows for device navigation data (i.e., navigation slice) are sent to another datacenter, and VOIP data (e.g., audio broadband slice) are sent to still another datacenter.

Figure 7:
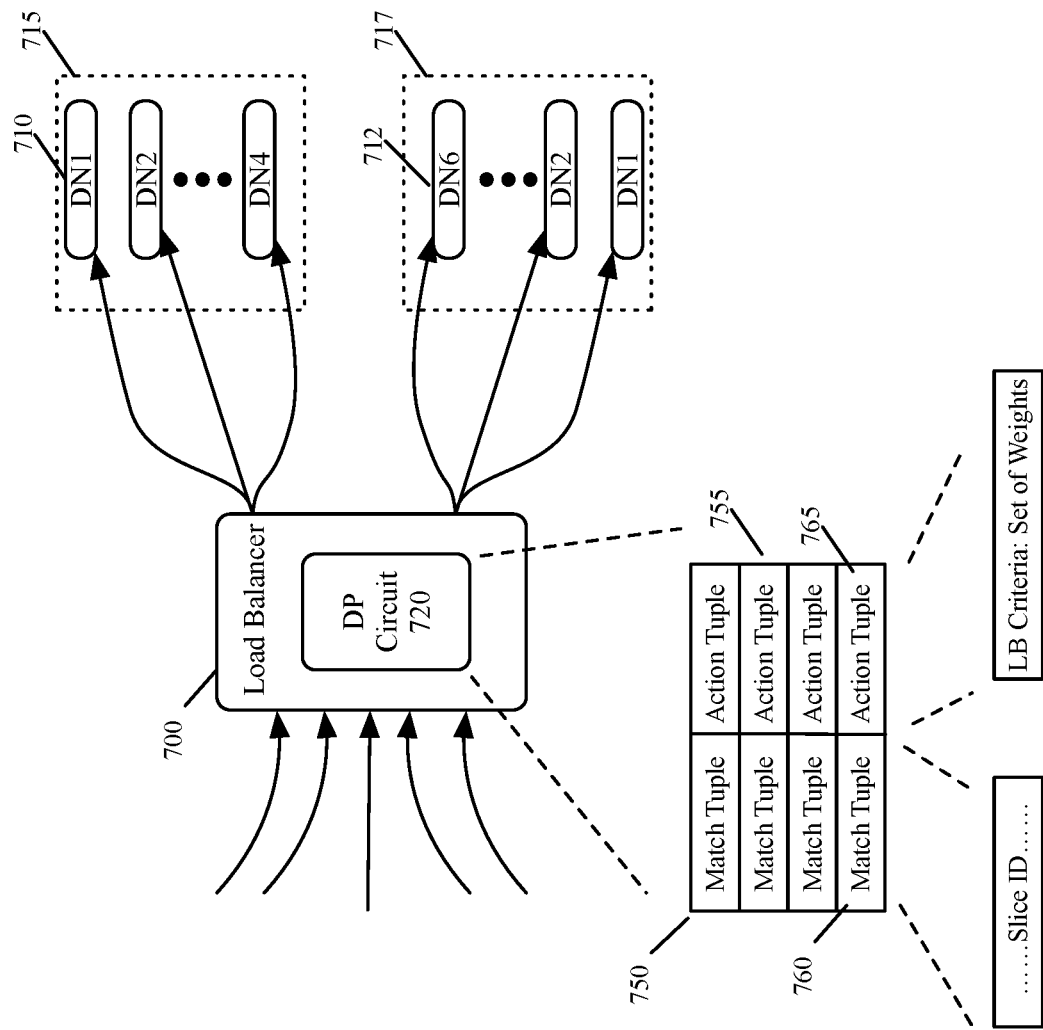
FIG. 7 illustrates a load balancer with a DP circuit that, based on the slice IDs associated with data message flows, performs a load balancing operation to distribute different data message flows to different destination nodes in different clusters.

In some embodiments, the HFE that performs the network-slice based operations on data message flows is a middlebox appliance that performs these operations as part of the middlebox services that it provides. For instance, FIG. 7 illustrates a load balancer 700 with a DP circuit 720 that, based on the slice IDs associated with data message flows, performs a load balancing operation to distribute different data message flows to different destination nodes in different clusters. This figure illustrates two different clusters 715 and 717 of destination nodes 710 and 712, one with four destination nodes and the other with six destination nodes.

As shown by load-balancing rules 755, the load balancer 700 in some embodiments distributes the data message load among several different destinations in the network based on load balancing criteria that is selected based on the slice identifiers associated with these data message flows. Specifically, as shown, the DP circuit 720 of the load balancer 700 in some embodiments has a match-action table 750 that includes several rules 755, each of which has a match tuple 760 that includes a slice ID and an action tuple 765 that includes a set of load balancing criteria (e.g., a set of weight values).

After identifying the slice ID associated with a data message flow, the DP circuit 720 matches the flow's slice ID with the match tuple 760 of one the rules 755, and then uses that matching rule's action tuple 765 to select a set of load balancing criteria for distributing the data message flows associated with the matching slice ID among several destination nodes 710/712 in a cluster 715/717. Instead of selecting among different destination nodes, the load balancing operation in other embodiments distributes the data message load among several different paths to the same destination in the network, e.g., again based on load balancing criteria that is selected based on the slice identifiers associated with these data message flows.

Figure 8:
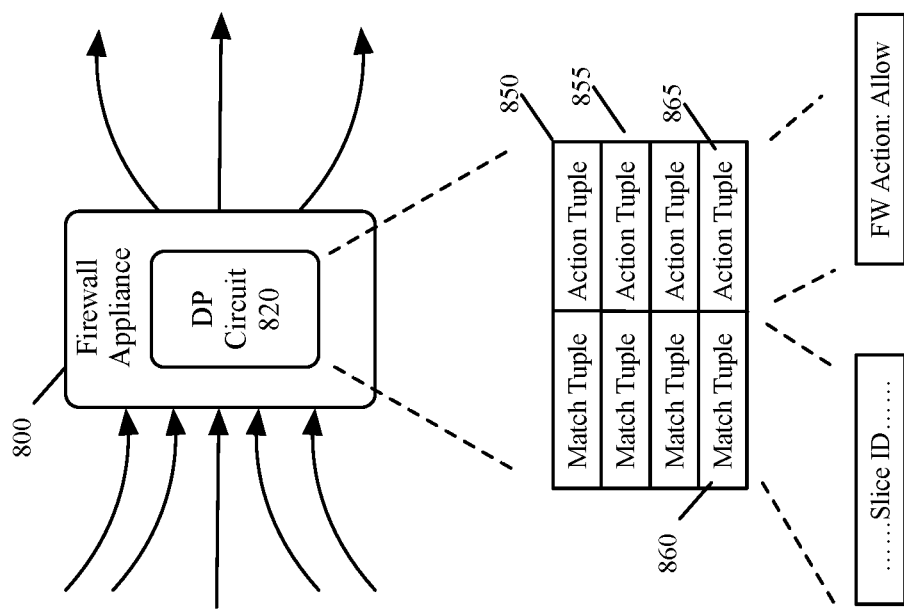
FIG. 8 illustrates a firewall appliance with a DP circuit that, based on the slice ID associated with data message flows, performs a firewall operation to determine whether to allow, to drop, or to redirect different data message flows.

FIG. 8 illustrates a firewall appliance 800 with a DP circuit 820 that, based on the slice ID associated with data message flows, performs a firewall operation to determine whether to allow, to drop, or to redirect different data message flows. Specifically, as shown, the DP circuit 820 of the firewall appliance 800 in some embodiments has a match-action table 850 that includes several rules 855, each of which has (1) a match tuple 860 that includes a slice ID, and (2) an action tuple 765 that specifies a firewall action, such as allow, drop or redirect.

After identifying the slice ID associated with a data message flow, the DP circuit 820 (1) matches the slice ID of a data message that it is processing with the match tuple 860 of one of the rules 855, (2) uses that matching rule's action tuple 865 to identify the firewall action to perform on the data message, and then (3) performs the identified firewall action on the data message. Other embodiments perform other slice-based middlebox service operations (such as destination network address translation, etc.).

In the middlebox embodiments (such as those described above by reference to FIGS. 7 and 8) or the forwarding element embodiments (such as those described above by reference to FIGS. 1-6), the HFE uses one of several techniques to first identify the slice identifier associated with a data message flow, before using the slice identifier to perform its middlebox or forwarding operation on the flow. Several such techniques will now be described by reference to FIGS. 9-12.

Figure 9:
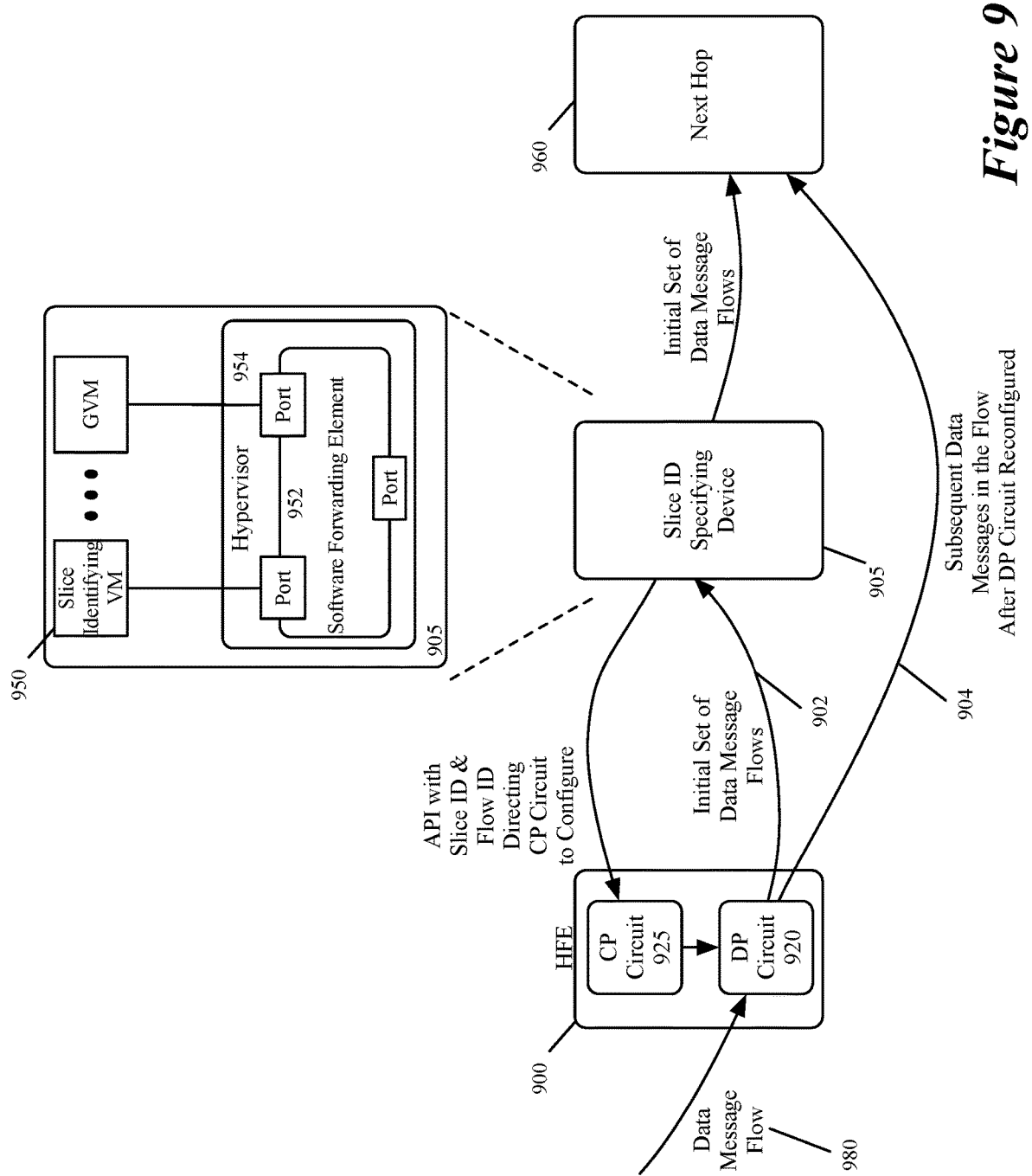
FIG. 9 illustrates a technique in which the HFE offloads the slice identification for an initial set of data messages in a new flow to an external device.

FIG. 9 illustrates a technique in which the HFE 900 offloads the slice identification for an initial set 902 of data messages in a new flow 980 to an external device 905, which after identifying the slice ID for the new data message flow, reconfigures a DP circuit 920 of the HFE 900 to be able to identify the slice ID for a later set 904 of data messages that it receives in this flow. Under this approach, the HFE 900 forwards an initial set 902 of one or more data messages that it receives in a new data message flow to the external device 905 (which is separate from the HFE), so that this external device can analyze these data messages to identify the slice ID associated with the data message flow.

The device 905 in some embodiments is a standalone appliance. However, in the embodiment illustrated in FIG. 9, the device is a slice identifying VM 950 executing on a host computer to analyze data messages received from the HFE 900 in order to ascertain their associated slice identifiers. U.S. patent application Ser. No. 16/443,812, filed Jun. 17, 2019, now published as U.S. Patent Publication 2020/0275358, discloses a process that the device 905 uses in some embodiments to identify the slice ID associated with a data message flow. U.S. patent application Ser. No. 16/443,812, now published as U.S. Patent Publication 2020/0275358, is incorporated herein by reference.

After identifying a slice ID for the initial set of data messages in the new flow, the device 905 identifies a forwarding rule based on the slice ID, and then forwards these initial data messages to a next hop 960 that it identifies based on this forwarding rule. In some embodiments, the device 905 has the same slice-based forwarding rules as the HFE 900 so that the device 905 can forward the initial data messages that it receives in the same manner that the HFE 900 will forward subsequent data messages in the same flow once it has been reconfigured to do so. When the external device is the slice identifying VM 950, the VM specifies the slice ID for a new flow, while the software forwarding element 952 of its hypervisor 954 processes the forwarding rule to perform the forwarding operation that forwards the initial set of data messages to their next hop 960.

Also, after identifying the slice ID for the initial set of data messages in the new flow, the device 905 includes the slice ID and the flow's identifier (e.g., five or seven tuple identifier) in an API call to the HFE's CP circuit 925. This API call directs the CP circuit 925 to create a match-action record in the DP circuit 920 that has the flow ID as part of its match tuple and the slice ID as part of its action tuple. As shown, the CP circuit 925 then provides configuration data to the DP circuit 920 to configure it to store a record that associates the received slice ID with the data message's attribute set.

Once the DP circuit 920 stores this record, it can use it to process subsequent data messages in the flow 980 and to produce the slice ID for these subsequent data messages. This slice ID then allows the DP circuit 920 to match the subsequent data messages with a match-action record that has the slice ID and flow ID as part of its match tuple and the DP egress port ID as part of its action tuple. Through this match-action record, the DP circuit 920 can identify the DP egress port ID for the subsequent data messages, which are then sent through the identified DP egress port, to its associated FE egress port to the next hop 960.

In the example illustrated in FIG. 9, the HFE 900, the DP circuit 920 and the external device 905 perform just a next-hop forwarding operation. In other embodiments, these components perform other operations. For instance, in some embodiments, the DP circuit 920 performs a slice-based middlebox operation. In some of these embodiments, the external device 905 also processes the same slice-based middlebox rules (e.g., firewall rules, etc.) as the DP circuit 920, so that it can perform the same middlebox service operations on the initial set of data messages as the DP circuit 920 performs on the subsequent set of data messages in the flow.

Figure 10:
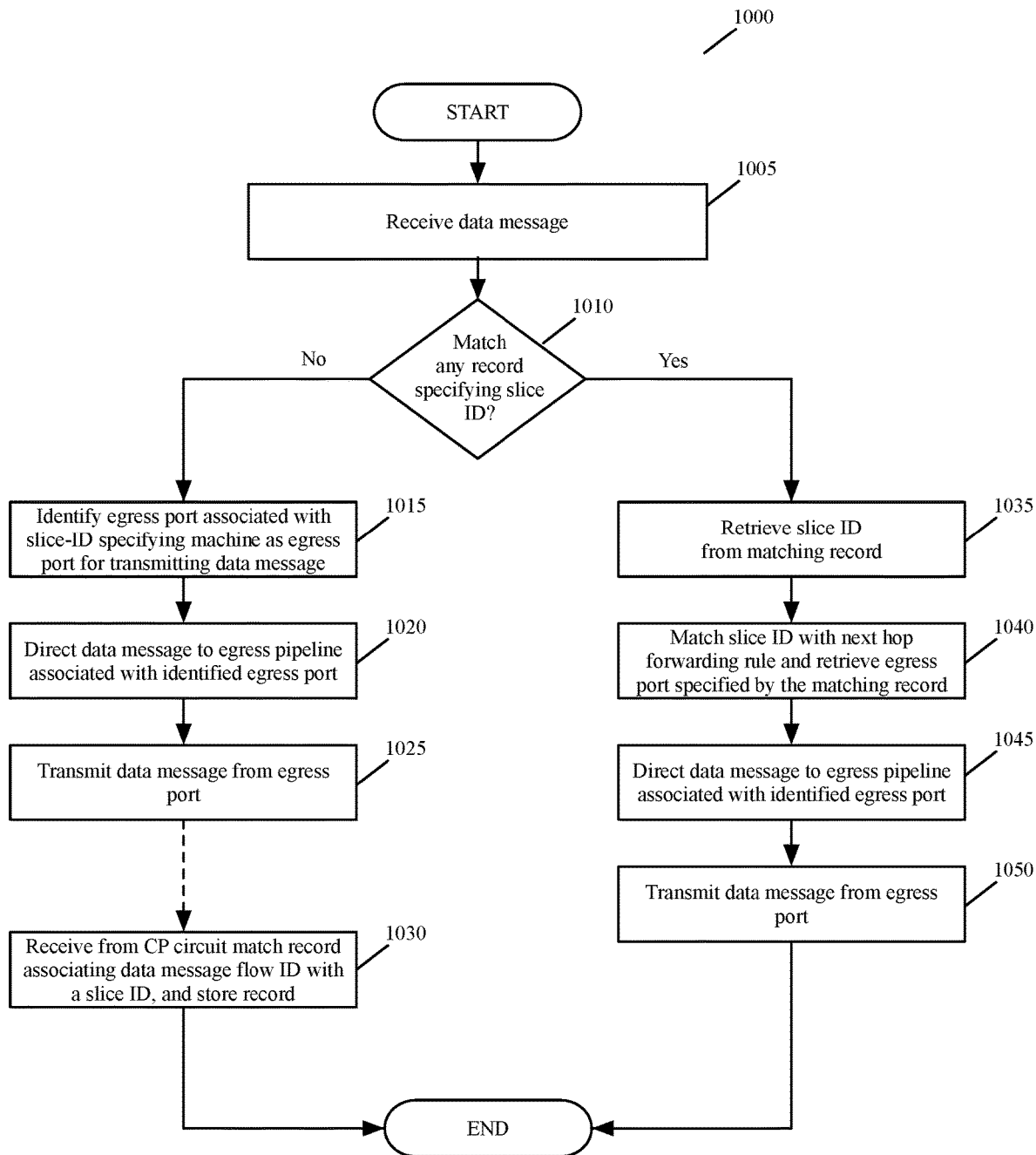
FIG. 10 presents a process that conceptually illustrates the operation of the DP circuit of FIG. 9 in some embodiments.

FIG. 10 presents a process 1000 that conceptually illustrates the operation of the DP circuit 920 of the HFE 900 in some embodiments. As shown, the process 1000 starts when the DP circuit 920 receives (at 1005) a data message to forward. At 1010, the process 1000 determines whether the received data message's flow identifier (e.g., its five or seven tuple identifier) matches a slice-ID specifying match record. If not, the data message is part of the initial set 902 of data messages that the DP circuit 920 has to forward to the slice-ID specifying device 905.

Hence, at 1015, the process identifies the DP egress port associated with the slice-ID specifying device 905. Next, at 1020, the crossbar switch 235 of the DP circuit 920 forwards the data message to the egress pipeline associated with the egress port identified at 1015. This egress pipeline then provides (at 1025) the data message to the identified DP egress port, which then sends the message to its associated FE egress port to transmit along the network.

A certain time period after sending (at 1025) the data message (and perhaps other data messages in the same flow) to the slice-ID specifying device 905, the device 905 directs the CP circuit 925 to configure the DP circuit 920 with a match record that associates the data message's tuple with a slice ID. In response, the CP circuit 925 configures the DP circuit 920 with this record, as conceptually illustrated by operation 1030 in FIG. 10. To depict the partial dependence of this operation on the external device 905 and the CP circuit 925, and its occurrence at an instance in time that is dependent on the device 905 and circuit 925, FIG. 10 uses a dashed arrow to depict the flow from operation 1025 to operation 1030. At 1030, the DP circuit 920 stores the record associating the data message's flow identifier with the slice ID provided by the device 905 and the CP circuit 925.

When the DP circuit 920 matches (at 1010) a received data message's flow identifier with a slice-ID specifying match record, the DP circuit 920 retrieves (at 1035) the slice ID from the matching record. It then uses (at 1040) the retrieved slice ID to match the received data message with a next-hop forwarding rule that is stored in a match-action table that associates slice IDs with next hop egress ports.

After identifying (at 1040) the next-hop record and the egress port from this record, the crossbar switch 235 of the DP circuit 920 forwards (at 1045) the data message to the egress pipeline associated with the egress port identified at 1040. This egress pipeline then provides (at 1050) the data message to the identified DP egress port, which then sends the message to its associated FE egress port to transmit along the network. After 1050, the process 1000 ends.

In some embodiments, a similar process to process 1000 is used when the HFE and its CP/DP circuits are used in another type of forwarding element or middlebox appliance. Specifically, in these embodiments, the DP circuit offloads the slice identification and processing of an initial set of data messages in a new flow to an external device (e.g., to a VM executing on a host computer). After identifying the slice ID for the new data message flow, the external device in these embodiments reconfigures the DP circuit (through its associated CP circuit of its HFE) to be able to identify the slice ID for a later set of data messages that it receives in this flow, so that the DP circuit can perform a slice-ID based forwarding or middlebox service operation on these later set of data messages.

Figure 11:
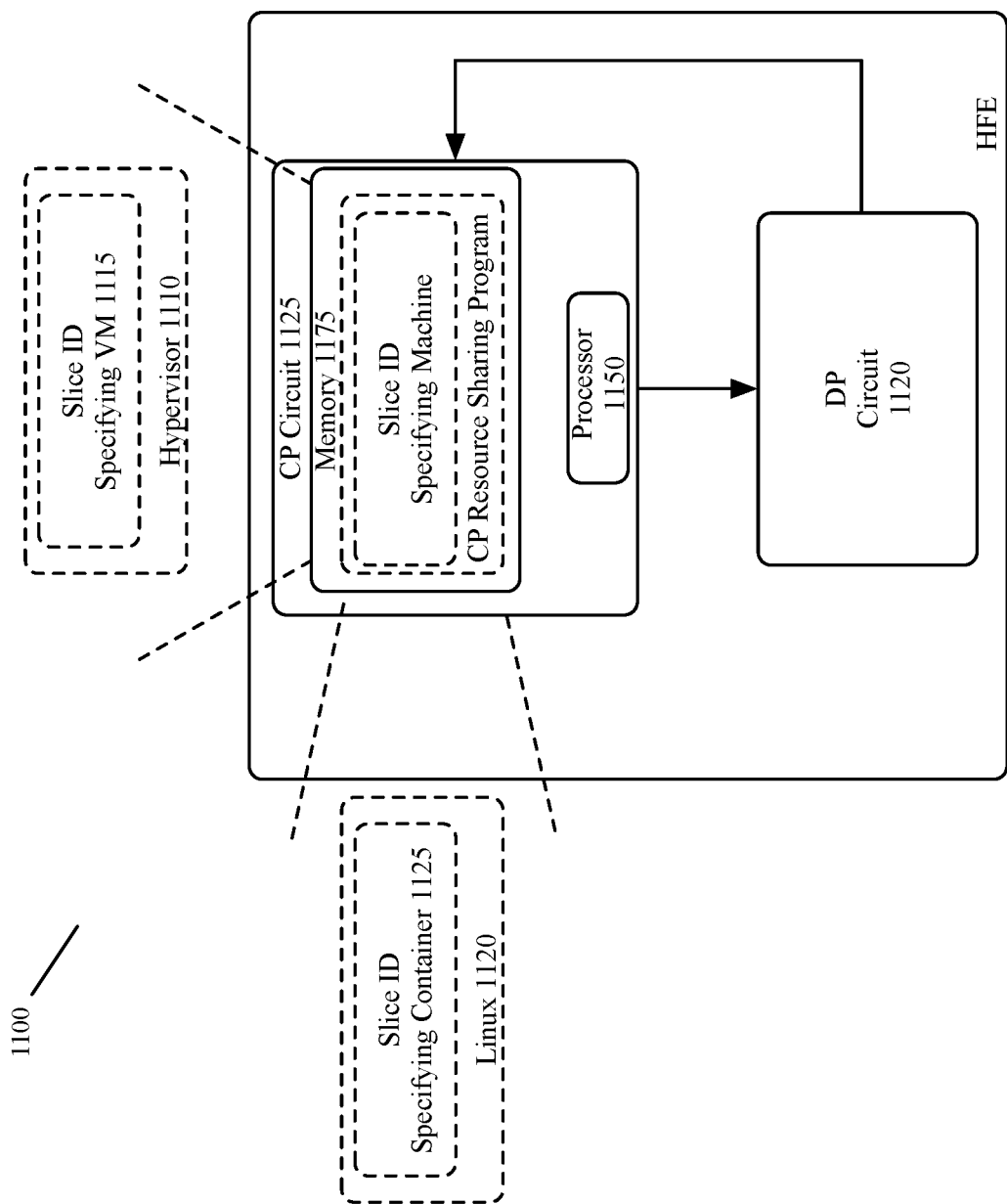
FIG. 11 illustrates another approach for an HFE to identify the slice ID associated with a newly received data message flow.

FIG. 11 illustrates another approach for an HFE to identify the slice ID associated with a newly received data message flow. In this approach, the HFE's DP circuit 1120 forwards an initial set of one or more data messages of the new flow to the HFE's CP circuit 1125 to analyze in order to identify the slice ID associated with the new data message flow. In some embodiments, the CP circuit executes a machine (e.g., a container or VM) or other program that uses the techniques described in the above-incorporated U.S. patent application Ser. No. 16/443,812 to identify a slice ID for a particular data message flow. After identifying the slice ID for the new data message flow, the CP circuit provides this slice identifier back to the DP circuit along with the data messages in the initial set for processing.

Instead of providing the data messages that it analyzes to the DP circuit to forward, the CP circuit in other embodiments forwards to their next-hop destinations (e.g., through one or more NICs of the forwarding element or the CP circuit) the data messages that it receives from the DP circuit, until the DP circuit is configured to perform the slice ID identification by the CP circuit. In some embodiments, the CP circuit and DP circuit perform L2 forwarding operations and/or L3 forwarding operations.

In some embodiments, the CP circuit 1125 includes a processor 1150 (e.g., a multi-core processor) for executing programs and a memory 1175 for storing programs. Two of the programs in the memory are a resource-sharing program, and a slice-identifying machine that executes on top of the resource sharing program in order to identify the slice identifier for the new data message flow. For instance, as shown, the program in some embodiments is a virtualization program 1110 (e.g., a hypervisor), and the machine is a virtual machine 1115. As further shown, the program in other embodiments is a Linux operating system 1120, and the machine is a container 1125. The VM 1115 or container 1125 in some embodiments use the methodology disclosed in the above-incorporated U.S. patent application Ser. No. 16/443,812 to identify the slice ID that is associated with a data message.

In either the VM example or the container example, the CP circuit in some embodiments provides the DP circuit 1120 with configuration data that configures it to store a match-action record that has (1) a match tuple that includes the flow's identifier (e.g., five or seven tuple identifier) and (2) an action tuple that includes its associated slice ID. After storing this record, the DP circuit 1120 uses it to generate the slice ID in the data plane for each received data message in the flow by matching the message's flow ID with the record's match tuple.

This slice ID then allows the DP circuit 1120 to match the data messages with a previously configured match-action record that has the slice ID and flow ID as part of its match tuple and the DP egress port ID as part of its action tuple. Through this match-action record, the DP circuit 1120 can identify the DP egress port ID for the subsequent data messages, which are then sent through the identified DP egress port, to its associated FE egress port, and then forwarded to a next hop. When the DP circuit 1120 implements a middlebox service, the slice ID is matched to a match-action rule that directs the DP circuit to perform a middlebox operation, like the operation described above by reference to FIGS. 7 and 8.

Figure 12:
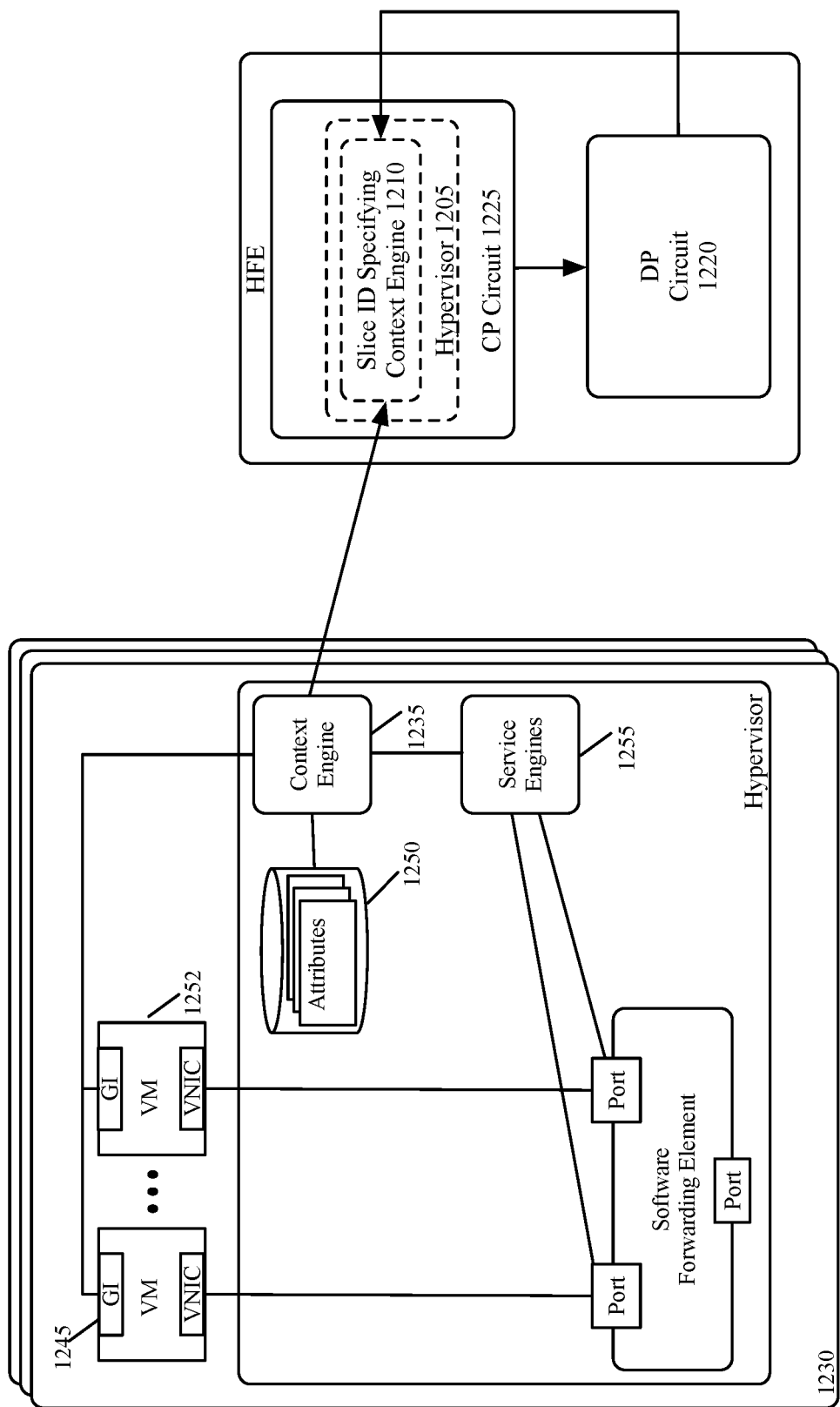
FIG. 12 illustrates an example of a hypervisor and a context engine executing on a control plane (CP) circuit to facilitate slice identification.

Instead of having a machine (container or VM) executing on top of the CP program to identify the slice ID associated with a data message flow, the CP circuit executes a hypervisor that includes a context engine that associates flow attributes with slice identifiers. FIG. 12 illustrates an example of such a hypervisor 1205 and a context engine 1210 executing on the CP circuit 1225. In this example, after the hypervisor 1205 starts to receive data messages of a new flow or its attribute set from the DP circuit 1220, it provides the received data message(s) or the flow's attribute set to the context engine 1210.

The context engine 1210 uses the attribute set of the received data message to identify the slice ID for the newly received flow. In some embodiments, the context engine executing on the CP circuit 1225 receives records matching data message attributes with slice identifiers from context engines 1235 of hypervisors executing on host computers 1230. The context engines 1235 on these host computers 1230 collect contextual attributes relating to data message flows, starting from the VMs 1252 executing on their host computers, from guest introspection (GI) agents 1245 operating on these VMs, and stores these contextual attributes in the data store 1250. Based on the collected contextual attributes and preconfigured rules, a host-side context engine 1235 in some embodiments generates a slice identifier for a data message flow, e.g., by mapping the traffic type contained in the data message flow (as detected by a GI agent executing on the VM or a DPI agent executing on its host) with a rule that associates traffic types to slice identifiers.

In some embodiments, the host context engines directly provide (e.g., through overlay tunnels or RPC messages) to the CP circuit's context engine 1210 records matching data message attributes with slice identifiers, while in other embodiments it indirectly provides this data through a set of one or more servers acting as a set of network managers or controllers. Several mechanisms for distributing contextual attributes (such as slice identifiers) between hypervisors running on devices are described in U.S. Patent Applications 2018/0159733 and 2018/0181423, which are incorporated herein by reference. Although several of the devices described in the U.S. Patent Applications 2018/0159733 and 2018/0181423 are computers, some embodiments use the mechanisms disclosed in U.S. Patent Applications 2018/0159733 and 2018/0181423 to distribute contextual attributes (such as slice identifiers) to hypervisors running on forwarding elements and middlebox devices.

Figure 13:
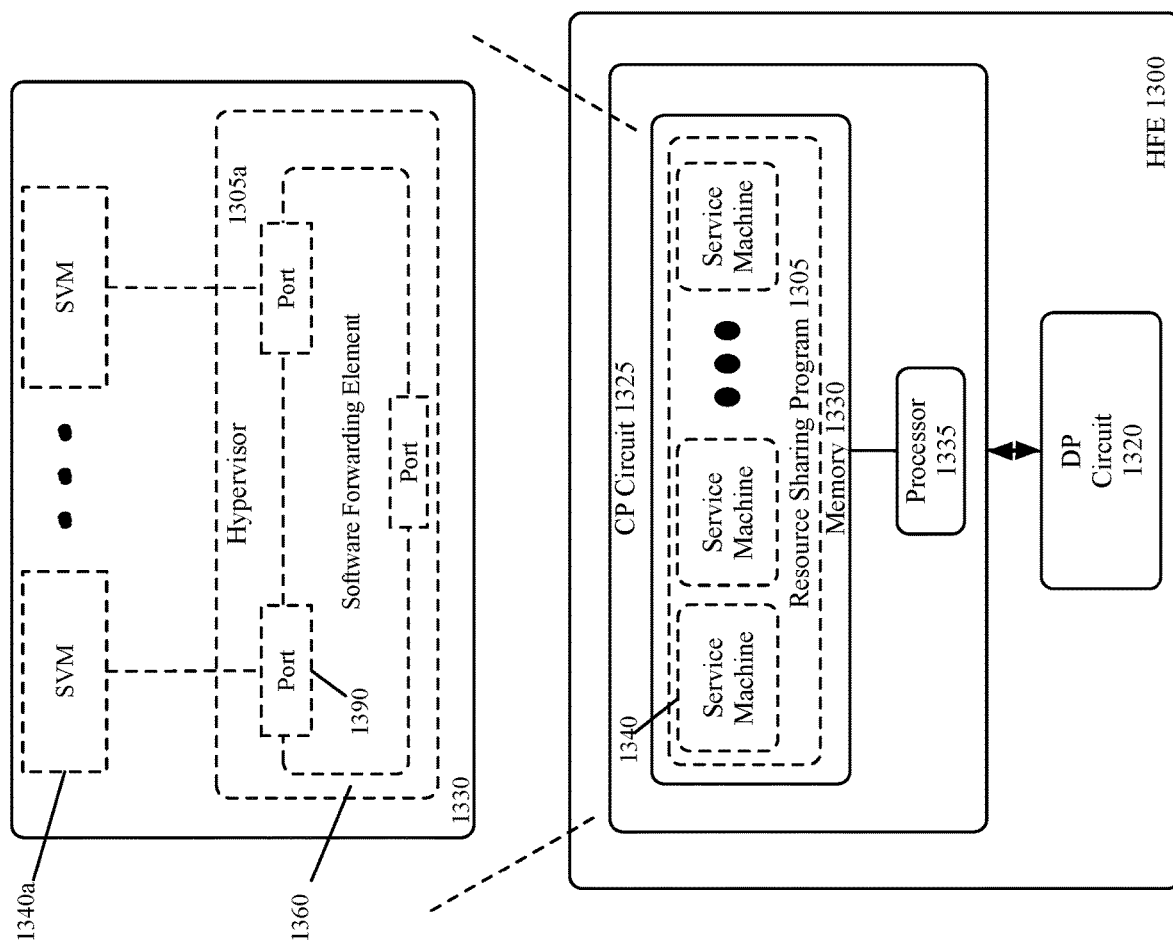
FIG. 13 illustrates that in some embodiments a CP circuit of an HFE executes one or more machines that perform one or more service operations of a service chain for the data messages processed by the HFE's DP circuit.

FIG. 13 illustrates that in some embodiments a CP circuit 1325 of an HFE 1300 executes one or more machines that perform one or more service operations of a service chain for the data messages processed by the HFE's DP circuit 1320. Specifically, it shows a CP circuit memory 1330 that stores a resource-sharing program, like a hypervisor or operating system (e.g., Linux OS), that is executed by a CP processor 1335. It also shows the CP circuit memory 1330 storing programs for implementing several service machines 1340 (such as VMs or containers) that service chain operations on data messages forwarded to the CP circuit 1325 by the DP circuit 1320. In some embodiments, the service chain operations performed by the service machines 1340 include a slice ID specifying operation.

Conjunctively, or alternatively, the service chain operations performed by the service machines 1340 in some embodiments include middlebox service operations, as well as compute and forwarding operations. As shown, the resource sharing program 1305 and the service machines 1340 in some embodiments are a hypervisor 1305a and service VMs (SVMs) 1340a. As further described below, the hypervisor 1305a includes a software forwarding element 1360 (e.g., a software switch) for communicatively connecting the SVMs to each other and to one or more NICs of the CP circuit 1325 through its ports 1390.

To execute such service machines, the CP circuit 1325 in some embodiments has a more powerful processor and more memory than the processors and memories that are typically used in some hardware forwarding elements today. After performing one or more service operations on a data message forwarded by the DP circuit 1320, the CP circuit 1325 in some embodiments returns these data messages to the DP circuit 1320 to forward the data message to its next destination in the network.

In other embodiments, after performing one or more service operations on a data message forwarded by the DP circuit 1320, the CP circuit 1325 forwards the data message to its next destination in the network through a NIC, the CP circuit 1325, or the HFE 1300. Also, in some embodiments, the CP circuit 1325 configures the DP circuit 1320 with the slice ID that it identifies for a data message flow. However, in some of these embodiments, instead of providing the data messages that it analyzes to the DP circuit 1320 to forward, the CP circuit 1325 in these embodiments forwards the data messages to its next-hop destination, until the DP circuit 1320 is configured to perform the slice ID identification by the CP circuit 1325. In some embodiments, the CP circuit 1325 and DP circuit 1320 perform L2 forwarding operations and/or L3 forwarding operations.

The machines executed by the CP circuit 1325 serve as a virtual data plane, while the DP circuit 1320 serves as a physical data plane. In other words, the HFE 1300 has two concurrently running data planes, a physical one implemented by the DP circuit 1320 and another virtual one implemented by the CP circuit 1325 executing the service machines 1340. In some embodiments, the HFE 1300 uses its virtual data plane (implemented by its CP circuit 1325) to process data messages that it cannot process in its physical DP circuit, e.g., uses its virtual data plane to produce a flow's slice ID, or to perform a service operation in a service chain.

In the embodiments where the resource sharing program 1305 of the HFE CP circuit 1325 is a hypervisor 1305*a*, one or more software forwarding elements execute on this hypervisor to implement the HFE's virtual data plane. Example of such software forwarding elements include a software switch (e.g., ESX switch running on an ESX hypervisor), a software routers, etc. In some embodiments, this software forwarding element processes the data messages that the CP circuit 1325 receives from the DP circuit 1320 to forward the data messages to SVMs 1340*a* executing on the hypervisor 1305*a* and/or to identify for the data messages the next hops in the network.

Along with software forwarding elements on other HFEs and/or on host computers, the software forwarding element executing on the CP circuit 1325 of an HFE 1300 in some embodiments implements one or more logical forwarding elements that span multiple HFEs and/or multiple host computers. Hence, in some embodiment, the software forwarding element of an HFE's CP circuit performs logical forwarding operations (e.g., lookup operations based on logical network identifiers).

Figure 14:
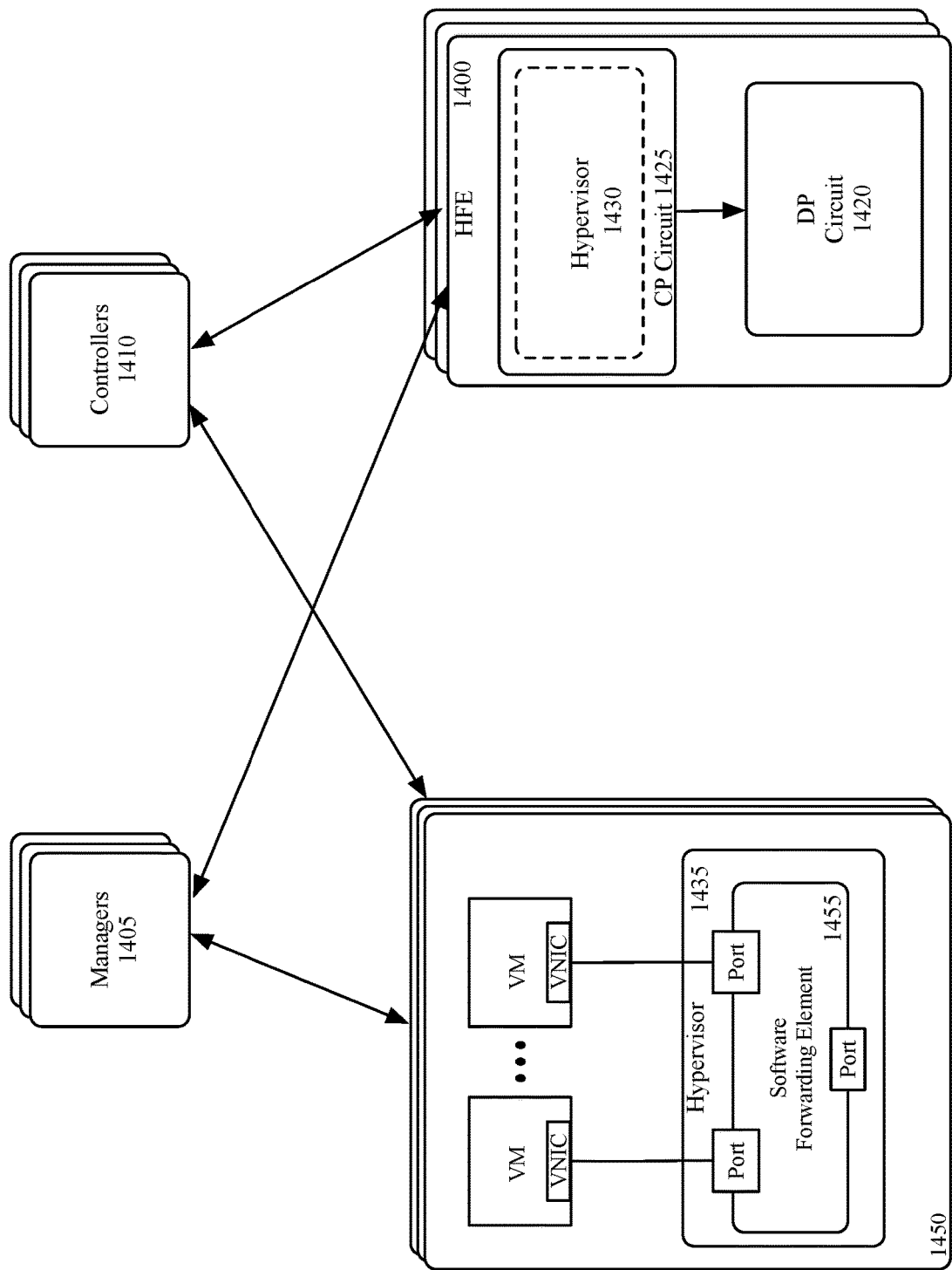
FIG. 14 illustrates CP circuits and host computers executing similar hypervisors.

In some embodiments, the hypervisors that execute on the CP circuits of the HFEs are the same or similar to the hypervisors executing on the host computers in the network. FIG. 14 illustrates one such example. In this example, the similar or identical hypervisors provide a common platform through which a common set of managers 1405 and controllers 1410 manage and control the HFEs 1400, the host computers 1450, and the SFEs 1455 executing on the host computers 1450.

In some embodiments, the managers 1405 and controllers 1410 manage and control the HFE's CP circuit 1425 like they manage and/or controller the host computers 1450 and the host SFEs 1455. For instance, through the common hypervisor platform, the managers 1405 and controllers 1410 define in some embodiments logical forwarding elements (e.g., logical overlay forwarding elements) that span across multiple software forwarding elements of host computers and multiple DP circuits of HFEs.

Also, through this common platform, the managers 1405 and controllers 1410 configure the host SFEs 1455 and the HFE DP circuits 1420 to perform sliced-based operations based on the same slice identifiers. Examples of such slice-based operations include slice-based forwarding operations and/or slice-based middlebox operations. Through the common hypervisor platform, the managers 1405 and the controllers 1420 in some embodiments use a common set of slice identifiers to define a common set of network slices across hardware and software SDDC resources, including HFEs and host computers executing SFEs and middlebox instances.

The hardware and software resources in some embodiments use the common slice identifiers to perform their operations (e.g., to select rules that they have to process). The common slice identifiers are also used by the managers 1405 and the controllers 1410 to define different sets of dedicated compute and networking resources in the SDDC for different network slices, as described above.

In addition to configuring the host SFEs 1455 and the HFE DP circuits 1420 to perform sliced-based operations, the managers 1405 and the controllers 1410 in some embodiments can also configure the SFEs and HFEs to also perform network operations based on more general security group identifiers. Examples of more general security groups include port groups, such as datacenter port groups, management port groups, virtual storage port groups, VM mobility port groups, etc. A port group ID in some embodiments is a way to associate certain ports in a datacenter together in order to apply the same forwarding and/or service policy on the ports.

In some embodiments, the managers 1405 and the controllers 1410 configure the HFE DP circuits 1420 by interacting with the HFE CP circuits 1425. Specifically, in some embodiments, the managers 1405 and the controllers 1410 use the hypervisors 1430 to provide configuration data and contextual data to the HFE CP circuits 1425, so that the CP circuits 1425 can configure their corresponding DP circuits 1420 to perform slice-based forwarding operations and/or slice-based middlebox operations.

In some embodiments, the managers 1405 and controllers 1410 use the hypervisors 1430 to deploy and configure compute elements that execute on the CP circuits 1425 of the HFEs 1400 and on host computers 1450. In other embodiments, the compute managers 1405 and compute controllers 1410 do not deploy and configure compute elements to execute on the CP circuits of the HFEs 1400.

The separate clusters of managers 1405 and controllers 1410 in FIG. 14 provide separate management and control planes for managing and controlling the hypervisor 1435 resources on the host computer 1450 and the HFEs 1400. In some embodiments, the managers 1405 define resources on the host computers 1450 and HFEs 1400, while the controllers 1410 configure these resources. Other embodiments, however, do not have separate management and control planes for managing/controlling these resources, but rather use just one cluster of servers to do both the management and control plane operations.

Figure 15:
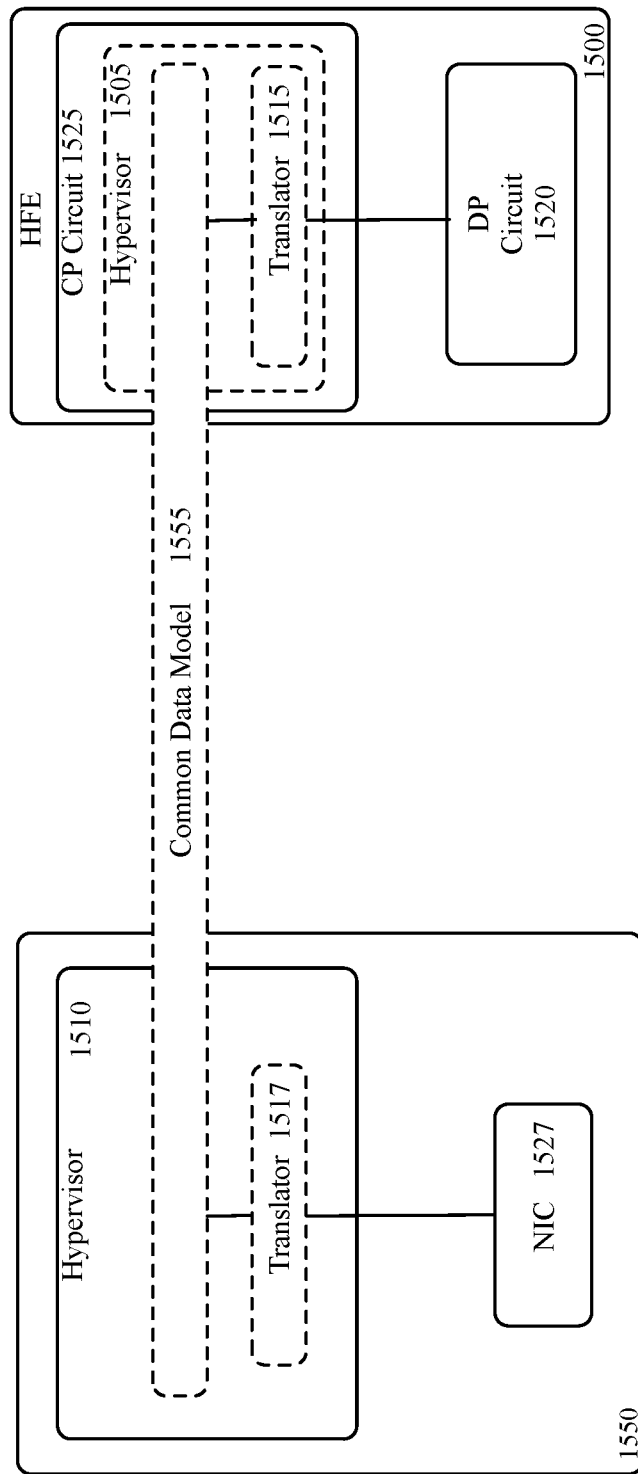
FIG. 15 illustrates that in some embodiments the hypervisors executing on the HFE's CP circuits use the same or similar data model abstraction as the hypervisors executing on host computers.

FIG. 15 illustrates that in some embodiments the hypervisors 1505 executing on the HFE's CP circuit 1525 uses a common data model abstraction 1555 as the hypervisors 1510 executing on host computers 1550. The hypervisors 1505 and 1510 use different translators 1515 and 1517 to convert respective communications to the HFE DP circuit 1520 and the host NIC 1525 into data formats decipherable by the DP circuit 1520 and the NIC 1527. These translators also convert communications from the DP circuit 1520 and the NIC 1527 to the hypervisors 1505 and 1510 back into the common data model format 1555.

These translators are implemented as plugins in some embodiments. Also, in some embodiments, no translator is used for the communications between the hypervisor 1510 and the host NIC 1527, as the common data model abstraction in these embodiments is a data model defined for the host NICs. Such embodiments just use a translator to convert the hypervisor communication of the data plane circuit from a NIC data model format to a DP circuit model format, and to perform the reverse translation.

Figure 16:
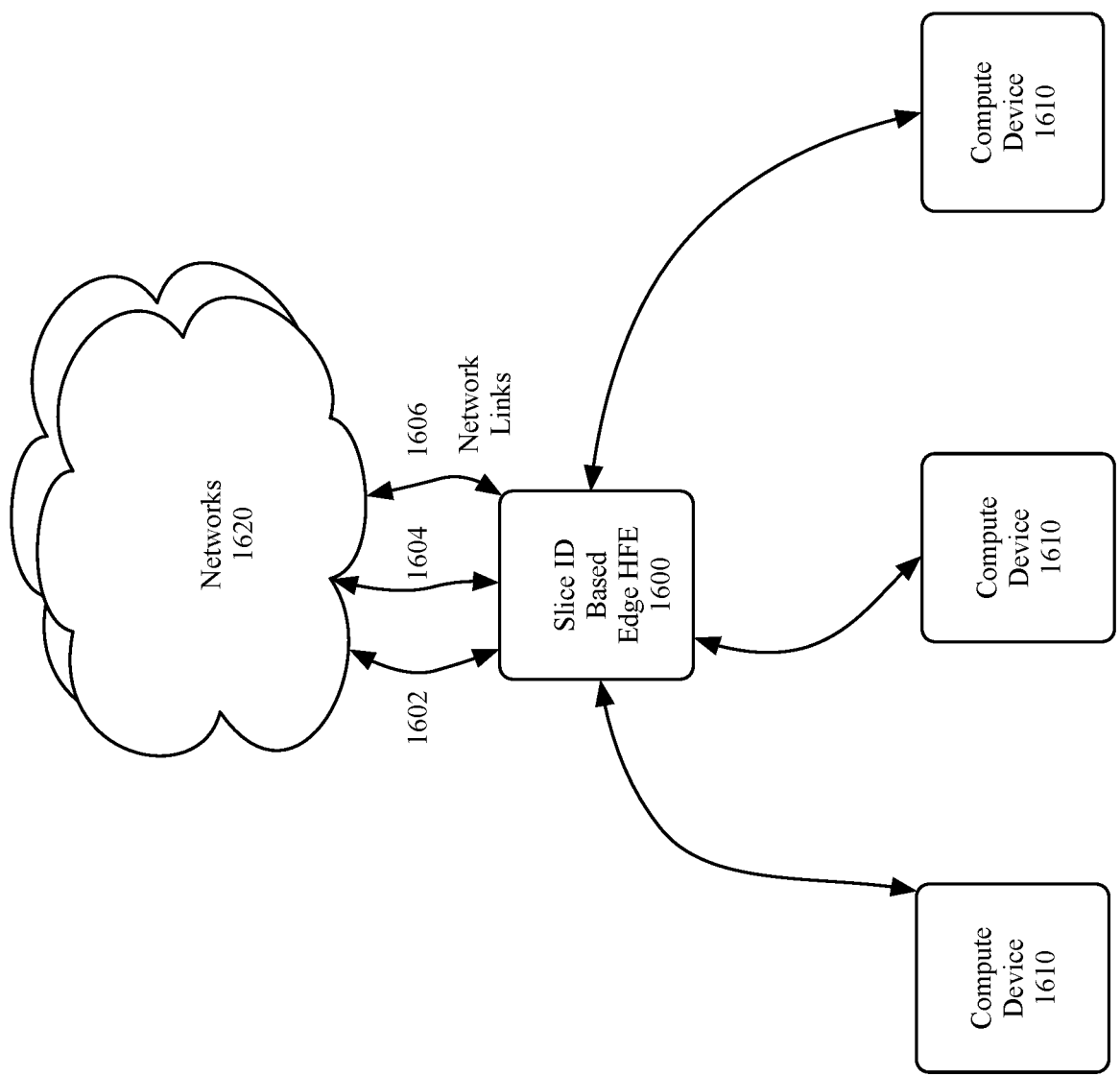
FIGS. 16 and 17 illustrate examples of using slice-based HFEs to perform SD-WAN (software-defined wide access network) operations.

FIG. 16 illustrates an example of using a slice-based HFE as an edge device 1600 of an SD-WAN (software-defined wide access network). This edge HFE operates at a particular local area network (LAN) of an entity to connect multiple devices 1610 (e.g., computers, tablets, smartphones, etc.) at this location to an entity's WAN through multiple network links, such as MPLS link 1602, broadband Internet link 1604, and 5G wireless link 1606. The WAN spans multiple networks 1620 (e.g., a private telecommunication network, the Internet, an MPLS provider's network, etc.) to connect different locations (e.g., different datacenters and branches) served by different LANs.

For each data message flow that it processes, the edge HFE 1600 identifies the slice ID associated with the data message flow, selects a network link (e.g., a link 1602, 1604, or 1606) for this slice ID (e.g., uses the slice ID to identify a link selection rule, and then select the link specified by this rule), and then routes the data message flow to its destination along the selected network link. In some embodiments, the data message flow has a header (e.g., an encapsulation header) that identifies its slice ID. In other embodiments, the edge HFE is configured with rules that associate different flow IDs with slice IDs. In still other embodiments, the edge HFE uses an external device (such as the slice ID specifying circuit 905 of FIG. 9), or a module/machine of its CP circuit (as shown in FIG. 11 or 12) to identify the slice ID for the data message flow.

Figure 17:
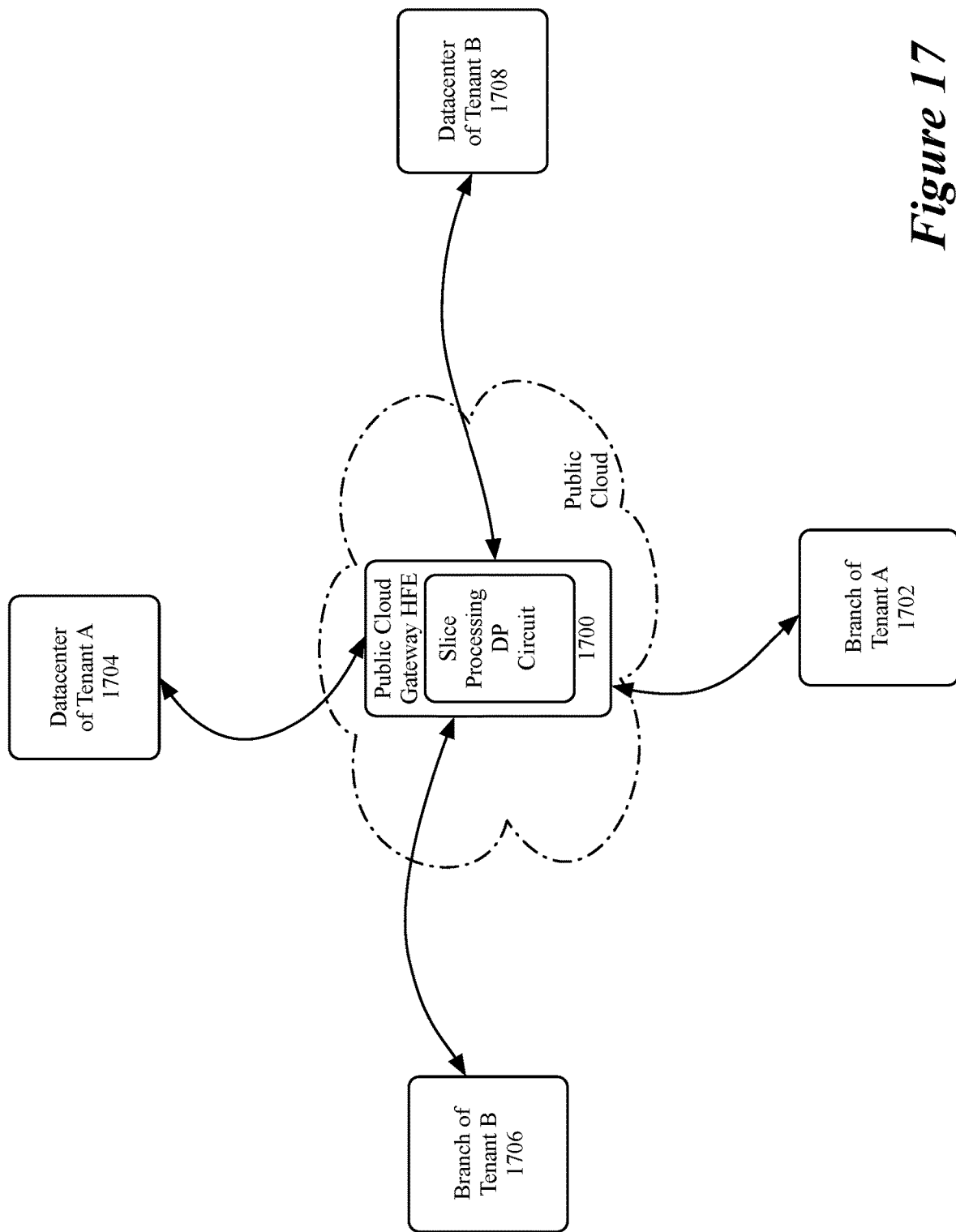

FIG. 17 illustrates another SD-WAN example. In this example, a slice-based HFE 1700 is used as a multi-tenant public cloud gateway to connect different LAN nodes of different tenants based on a tenant slice ID. For each tenant, the public cloud gateway 1700 establishes the tenant's SD-WAN by connecting two or more LANs of the tenant, which are often at different physical locations. In this example, the public cloud gateway 1700 connects a branch office 1702 and a datacenter 1704 of tenant A, and a branch office 1706 and a datacenter 1708 of a tenant B.

For each data message flow that it processes, the gateway 1700 identifies the slice ID associated with the data message flow, selects a next-hop routing table associated with this slice ID, and then routes the data message flow to its destination by using the next-hop routing table. The gateway identifies the slice ID differently in different embodiments, e.g., extracts it from the data message flow's header (e.g., an encapsulation header) in some embodiments, uses a preconfigured table that associates flow IDs with slice IDs in other embodiments, or uses an external device, or a module/machine of its CP circuit, in still other embodiments.

The HFEs of some embodiments can be configured to implement ingress-side flow controls for a device by collecting statistics regarding their egress-side traffic to the device, reporting the collected statistics to a set of servers, and receiving new egress side limits to adjust the amount of flows forwarded to the device by the HFEs. In some embodiments, HFEs drop data messages to stay under thresholds specified by the egress-side limits that they receive, or delay the transmission of the data messages when reaching such thresholds.

Figure 18:
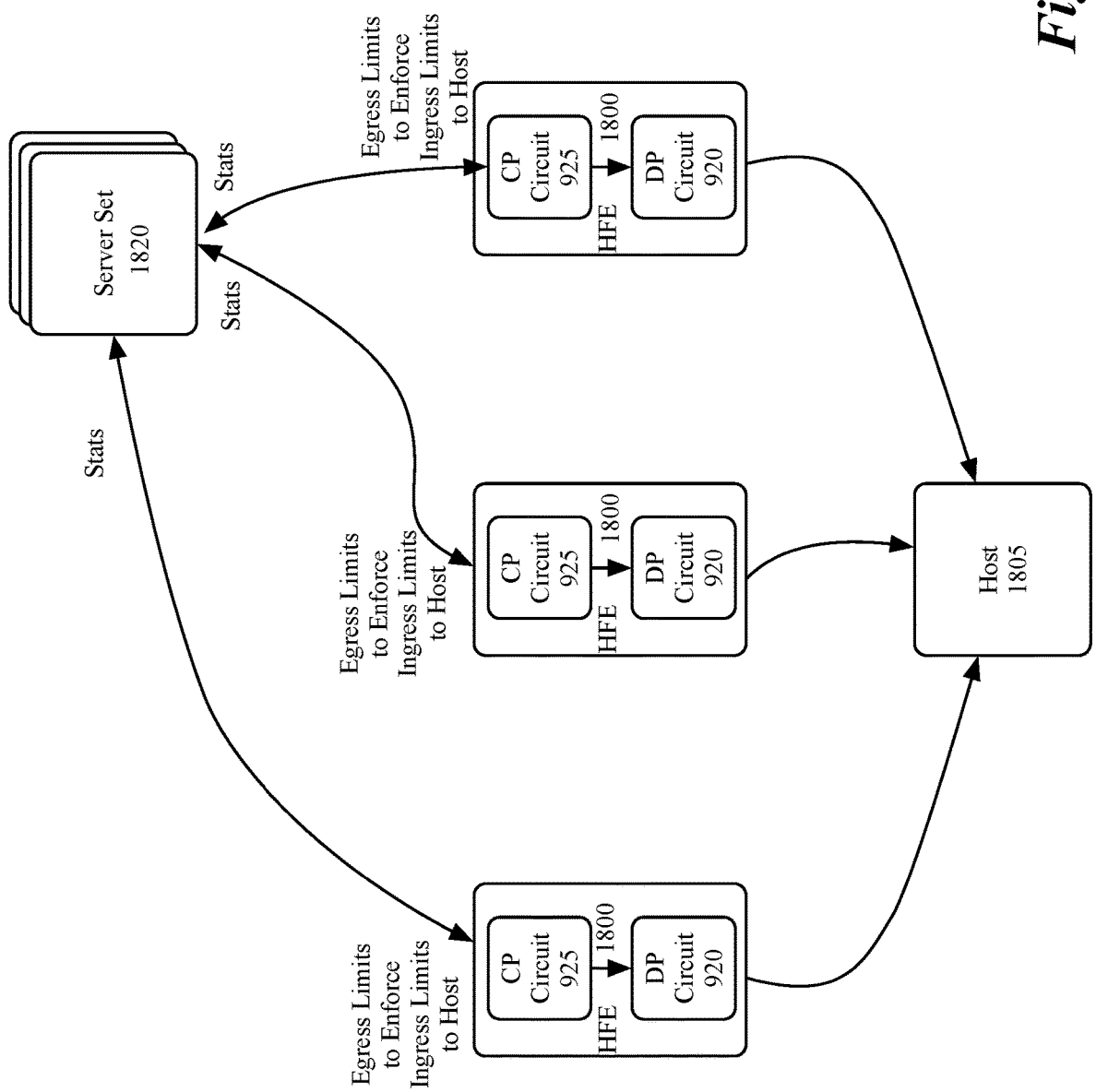
FIG. 18 illustrates an example of several HFEs implementing ingress-flow controls for a host computer.

FIG. 18 illustrates one such technique in which several HFEs 1800 implement ingress-flow controls for a device 1805, which can be a host computer, a machine executing on a host computer, a server, or any other kind of device. In this example, each HFE generates statistics regarding the data message flows that it sends to the device 1805. The HFEs in some embodiments can generate any number of different statistics, such as number of data messages, byte count, etc. These statistics in some embodiments are flow specific, i.e., the HFEs compute statistic values for each of several different flows. The flows can be individual five- or seven-tuple flows, or they can be aggregate flows that include several individual flows (e.g., aggregate flow that encompasses all individual flows with the same source and destination IP addresses). In addition to being flow based, or instead of being flow based, the HFE generates the statistics for each slice ID in some embodiments, in order to quantify how much traffic of a particular network slice the device receives.

The HFEs provide the generated statistics to the set of servers 1820 (e.g., controllers or managers), which then analyze the statistics to determine whether the amount of traffic forwarded to the device 1805 exceeds a threshold value. When this threshold value is reached, the server set 1820 proves new egress limits (e.g., for all flows, for certain flows, for certain slice IDs, or for certain combination of flow and slice IDs, etc.) to the HFEs. The HFEs then use these new egress limits to control how much data messages that they send to the device 1805 (e.g., for all flows, for certain flows, for certain slice IDs, or for certain combination of flow and slice IDs, etc.).

As mentioned above, HFEs in some embodiments drop data messages to stay under thresholds specified by the egress-side limits that they receive, or delay the transmission of the data messages when reaching such thresholds. Also, in some embodiments, the server set 1820 can distribute the same new egress limit to each HFE 1800, or different new egress limits to different HFEs 1800, in order to adjust the data message flow to the host 1805.

Figure 19:
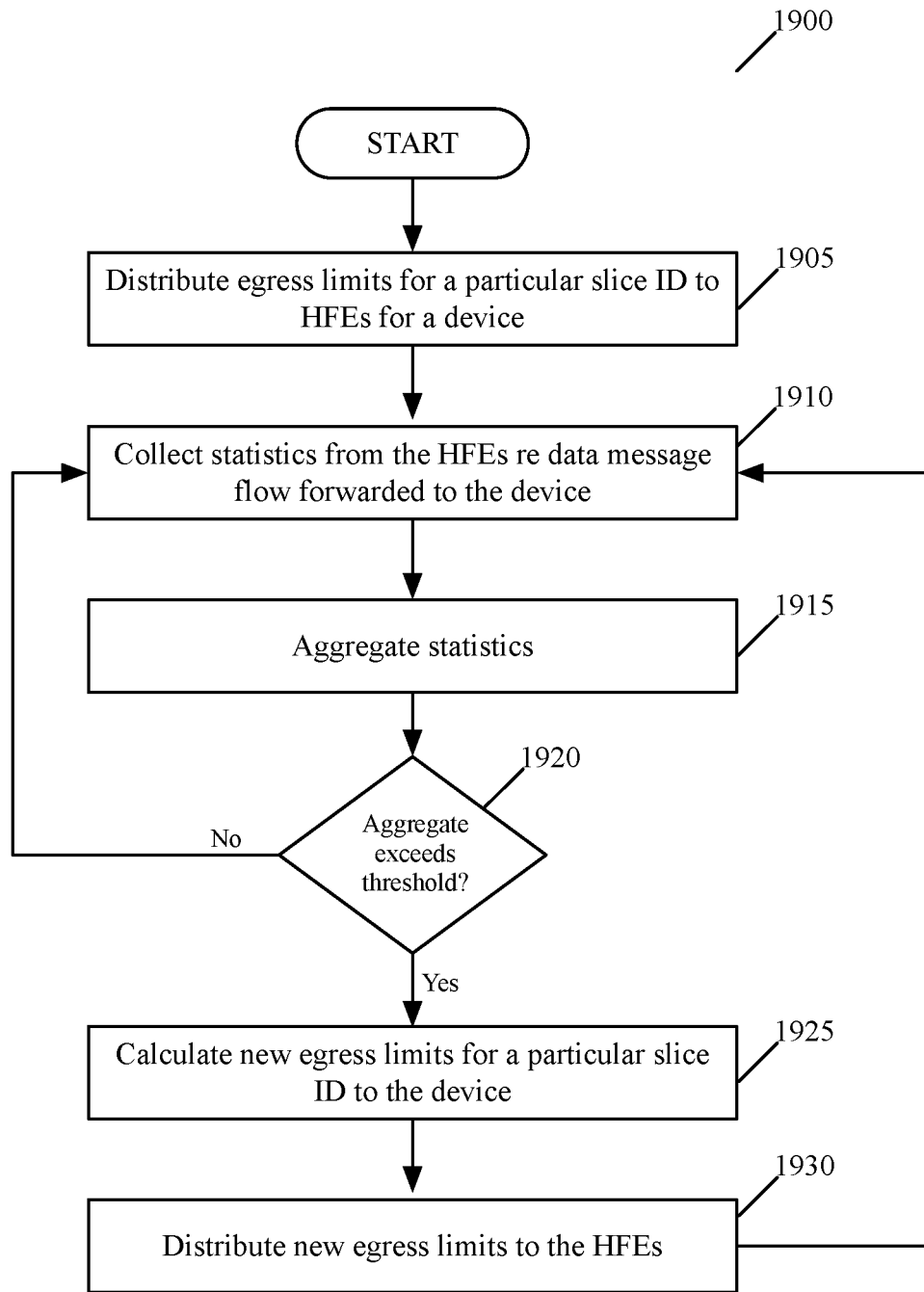
FIG. 19 illustrates a process that a server set uses to configure the HFEs to implement ingress-flow controls for the host computer in FIG. 18.

FIG. 19 illustrates a process 1900 that the server set 1820 performs in some embodiments to control the ingress data message load for a particular slice ID to the device 1805. This process is used in some embodiments to ensure that the device 1805 does not process more than a certain amount of data messages for a particular slice. As shown, the process starts (at 1905) by distributing to the HFEs 1800 egress-side limits for the data message load (e.g., number of bytes per second, etc.) of a particular slice that the HFEs can forward to the device 1805.

In some embodiments, the process distributes these limits through an API call to the HFE CP circuit, which then configures the HFE DP circuit to observe these limits. As mentioned above, HFEs in some embodiments drop data messages to stay under thresholds specified by the egress-side limits that they receive, or delay the transmission of the data messages when reaching such thresholds. Also, in some embodiments, the server set 1820 can distribute the same egress limit to each HFE 1800, or different egress limits to different HFEs 1800.

A time period later, the server set collects (at 1910) statistics from the HFEs regarding the data message load for the particular slice forwarded to the device 1805. The collected statistics in some embodiments relate to the limits distributed by the server set. For instance, when the limits are expressed in terms of number of bytes per second, the collected statistics express an average number of bytes per second that the HFEs distributed to the device, or a total number of bytes distributed during the time period, for the particular slice.

At 1915, the process aggregates statistics collected from the HFEs for the particular slice. It then determines (at 1920) whether the aggregate statistics exceeds a desired threshold amount (e.g., a desired total number of bytes per second). If not, the process returns to 1910 to wait the next batch of reported statistics. On the other hand, when the aggregate statistics for the particular slice exceeds a threshold amount, the process calculates (at 1925) new egress limits on the data message flows of the particular slice that can be forwarded to the device.

For instance, if the device should not receive more than 100 Mbits/second for the particular slice, the server set 1820 might initially distribute a 50 Mbits/second limit to each HFE, based on an assumption that the HFEs will never be running more than 50% of this limit to the device 1805. However, the collected statistics might show that in a time period three HFEs sent 35 Mbits/second, 45 Mbits/second and 50 Mbits/second to the device, and the aggregate of this exceeds the overall limit by 100 Mbits/second. Hence, the server set might cut the individual limits for each of the HFEs to 33 Mbits/second to ensure that their aggregate cannot exceeds the overall limit.

After calculating the new limits (at 1925), the process distributes (at 1930) these new limits to the HFEs. Again, in some embodiments, the process distributes these limits through an API call to the HFE CP circuit, which then configures the HFE DP circuit to observe these limits. As mentioned above, HFEs in some embodiments drop data messages to stay under thresholds specified by the new egress-side limits that they receive, or delay the transmission of the data messages when reaching such thresholds. Also, in some embodiments, the server set 1820 can distribute the same new egress limit to each HFE 1800, or different new egress limits to different HFEs 1800. After 1930, the process returns to 1910 to wait the next batch of reported statistics.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 20:
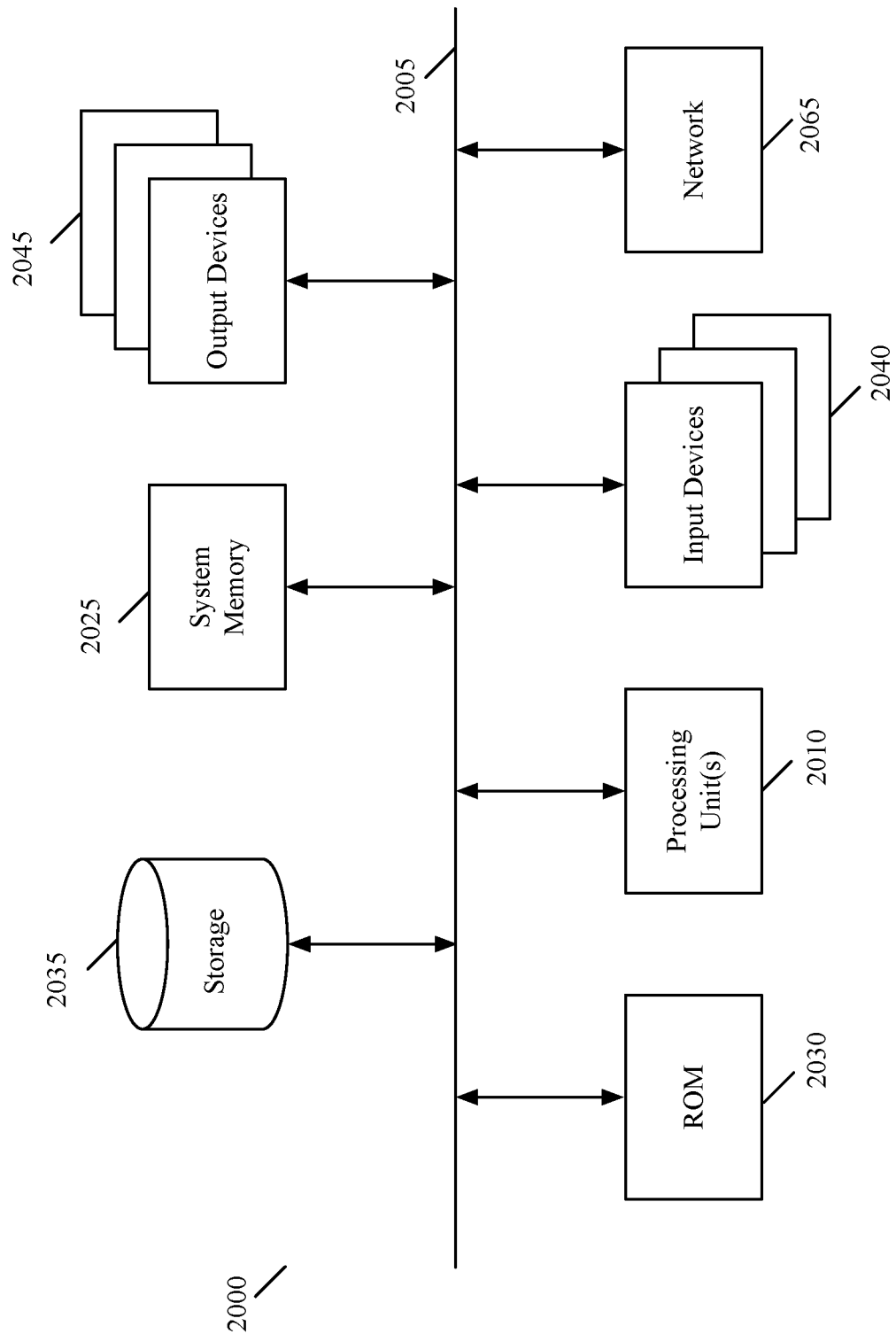
FIG. 20 conceptually illustrates a computer system with which some embodiments of the invention are implemented.

FIG. 20 conceptually illustrates a computer system 2000 with which some embodiments of the invention are implemented. The computer system 2000 can be used to implement any of the above-described hosts, CP circuits, controllers, and managers. As such, it can be used to execute any of the above described processes. This computer system includes various types of non-transitory machine readable media and interfaces for various other types of machine readable media. Computer system 2000 includes a bus 2005, processing unit(s) 2010, a system memory 2025, a read-only memory 2030, a permanent storage device 2035, input devices 2040, and output devices 2045.

The bus 2005 collectively represents all system, peripheral, and chipset buses that communicatively connect the numerous internal devices of the computer system 2000. For instance, the bus 2005 communicatively connects the processing unit(s) 2010 with the read-only memory 2030, the system memory 2025, and the permanent storage device 2035.

From these various memory units, the processing unit(s) 2010 retrieve instructions to execute and data to process in order to execute the processes of the invention. The processing unit(s) may be a single processor or a multi-core processor in different embodiments. The read-only-memory (ROM) 2030 stores static data and instructions that are needed by the processing unit(s) 2010 and other modules of the computer system. The permanent storage device 2035, on the other hand, is a read-and-write memory device. This device is a non-volatile memory unit that stores instructions and data even when the computer system 2000 is off. Some embodiments of the invention use a mass-storage device (such as a magnetic or optical disk and its corresponding disk drive) as the permanent storage device 2035.

Other embodiments use a removable storage device (such as a floppy disk, flash drive, etc.) as the permanent storage device. Like the permanent storage device 2035, the system memory 2025 is a read-and-write memory device. However, unlike storage device 2035, the system memory is a volatile read-and-write memory, such as random access memory. The system memory stores some of the instructions and data that the processor needs at runtime. In some embodiments, the invention's processes are stored in the system memory 2025, the permanent storage device 2035, and/or the read-only memory 2030. From these various memory units, the processing unit(s) 2010 retrieve instructions to execute and data to process in order to execute the processes of some embodiments.

The bus 2005 also connects to the input and output devices 2040 and 2045. The input devices enable the user to communicate information and select commands to the computer system. The input devices 2040 include alphanumeric keyboards and pointing devices (also called "cursor control devices"). The output devices 2045 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 20, bus 2005 also couples computer system 2000 to a network 2065 through a network adapter (not shown). In this manner, the computer can be a part of a network of computers (such as a local area network ("LAN"), a wide area network ("WAN"), or an Intranet), or a network of networks (such as the Internet). Any or all components of computer system 2000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims

The invention claimed is:

1. A method of performing operations on a data message at a hardware forwarding element (HFE) in a network, the method comprising:
    at the HFE comprising a control plane (CP) circuit and a data plane (DP) circuit, which comprises an application specific integrated circuit (ASIC) having a plurality of message processing stages to process data messages received by the HFE, each message processing stage comprising at least one match-action table:
    receiving the data message at the DP circuit;
    identifying a network slice associated with the received data message by forwarding the received data message from the DP circuit to the CP circuit and receiving at the DP circuit a slice identifier identifying the network slice from the CP circuit, said network slice associated with a plurality of operations to be performed on the received data message by a plurality of network elements including the HFE and a plurality of machines executing on a set of computers in the network, wherein the identified network slice corresponds to a particular type of traffic and the HFE forwards the received data message to a first computer in the set of computers; and
    using at least one match-action table of at least one message processing stage of the ASIC of the DP circuit to match the slice identifier with a match attribute of a match-action record that specifies a particular operation for processing data messages associated with the identified network slice,
    wherein the CP circuit executes a hypervisor and a particular machine that executes on top of the hypervisor to identify the slice identifier for the data message.

2. The method of claim 1,
    wherein using at least one match-action table comprises using a set of one or more message processing stages of the ASIC to perform the particular operation on the data message.

3. The method of claim 2, wherein the particular operation comprises forwarding the received data message to a particular port of the HFE.

4. The method of claim 3, wherein the particular operation is a next-hop forwarding operation that selects between different next hops of different paths to same destinations in the network.

5. The method of claim 3, wherein the particular operation is a next-hop forwarding operation that selects between different next hops of different paths to different destinations in the network.

6. The method of claim 3, wherein the particular port corresponds to a connection to a first datacenter, wherein the particular operation selects between different ports that connect to different datacenters.

7. The method of claim 2, wherein the particular operation is a forwarding operation of a logical forwarding element implemented by the HFE.

8. The method of claim 2, wherein the particular operation is a firewall operation that determines whether to drop or allow the data message.

9. The method of claim 2, wherein the particular operation is a middlebox service operation to perform on the data message.

10. The method of claim 9, wherein the middlebox service operation is a load balancing operation that distributes the load among a plurality of different destinations or different paths in the network.

11. The method of claim 1, wherein a set of operations associated with a network slice comprises a plurality of operations performed by the plurality of machines in the network.

12. The method of claim 1, wherein the plurality of machines comprises at least one of virtual machines and containers.

13. The method of claim 11, wherein the plurality of operations comprises virtual network functions (VNFs) implemented by a telecommunication company.

14. The method of claim 1, wherein the plurality of machines implements a service chain associated with the identified network slice.

15. The method of claim 1, wherein the plurality of machines comprises virtual machines or containers.

16. The method of claim 1, wherein
    the hypervisor includes a context engine that associates data message attributes with slice identifiers; and
    the context engine uses a set of attributes of the received message to identify the slice identifier for the received message.

17. The method of claim 16, wherein the context engine receives records matching data message attributes with slice identifiers from context engines of hypervisors executing on host computers.

18. The method of claim 16, wherein the context engine receives records matching data message attributes with slice identifiers from a set of one or more servers acting as a set of network managers or controllers.

19. The method of claim 1, wherein
the CP circuit configures the DP circuit by providing configuration data to configure the DP circuit with operations to process data messages based on their associated slice identifiers.

* * * * *